US008612627B1

(12) United States Patent
Brandwine

(10) Patent No.: US 8,612,627 B1
(45) Date of Patent: *Dec. 17, 2013

(54) MANAGING ENCODED MULTI-PART COMMUNICATIONS FOR PROVIDED COMPUTER NETWORKS

(75) Inventor: Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 871 days.

This patent is subject to a terminal disclaimer.

(21) Appl. No.: 12/717,058

(22) Filed: Mar. 3, 2010

(51) Int. Cl.
*G06F 15/173* (2006.01)
*G01R 31/08* (2006.01)

(52) U.S. Cl.
USPC .......................................... 709/240; 370/238

(58) Field of Classification Search
USPC ..................... 709/227, 240; 370/238, 399
See application file for complete search history.

(56) References Cited

U.S. PATENT DOCUMENTS

| 6,411,967 | B1 | 6/2002 | Van Renesse | 707/201 |
|---|---|---|---|---|
| 6,529,953 | B1 | 3/2003 | Van Renesse | 709/223 |
| 6,724,770 | B1 | 4/2004 | Van Renesse | 370/432 |
| 6,888,797 | B1 | 5/2005 | Cao et al. | 370/235 |
| 7,068,666 | B2 | 6/2006 | Foster et al. | 370/397 |
| 7,068,667 | B2 | 6/2006 | Foster et al. | 370/398 |
| 7,124,289 | B1 | 10/2006 | Suorsa | 713/1 |
| 7,131,123 | B2 | 10/2006 | Suorsa et al. | 717/177 |
| 7,152,109 | B2 | 12/2006 | Suorsa et al. | 709/226 |
| 7,251,215 | B1 | 7/2007 | Turner et al. | 370/231 |
| 7,660,245 | B1 * | 2/2010 | Luby | 370/230 |
| 7,730,183 | B2 * | 6/2010 | Brown et al. | 709/226 |
| 8,117,289 | B1 * | 2/2012 | Miller et al. | 709/220 |
| 8,223,770 | B2 * | 7/2012 | Wray et al. | 370/392 |
| 8,239,572 | B1 * | 8/2012 | Brandwine et al. | 709/240 |
| 8,279,755 | B2 * | 10/2012 | Luby | 370/230 |
| 8,296,459 | B1 * | 10/2012 | Brandwine et al. | 709/241 |
| 2004/0190532 | A1 * | 9/2004 | Oguchi et al. | 370/399 |
| 2004/0243705 | A1 * | 12/2004 | Netravali et al. | 709/225 |

(Continued)

OTHER PUBLICATIONS

"Chapter: Configuring Layer 2 Services Over MPLS," JUNOSe Internet Software for E-series Routing Platforms: Routing Protocols Configuration Guide, vol. 2, Mar. 2004, retrieved Jan. 26, 2007, from http://www.juniper.net/techpubs/software/erx/junose52/swconfig-routing-vol2/html/title-swconfig . . . , pp. 357-382, 31 pages.
"Cisco IP Solution Center MPLS VPN Management 4.2," Cisco Systems, Inc., retrieved Jan. 24, 2007, from http://www.cisco.com/en/US/products/sw/netmgtsw/ps5332/products_data_sheet_09186a008017d7 . . . , 5 pages.

(Continued)

*Primary Examiner* — Firmin Backer
*Assistant Examiner* — Michael A Chambers
(74) *Attorney, Agent, or Firm* — Seed IP Law Group PLLC

(57) ABSTRACT

Techniques are described for providing managed computer networks. In some situations, the techniques include managing communications for computing nodes of a managed computer network by automatically determining to separate a particular outgoing packet or other outgoing communication from a source computing node into multiple parts (e.g., multiple packets) to be independently sent using two or more alternative network paths between the sending computing node and the destination for the communication. For example, a manager module associated with the source computing node may automatically determine to encode the outgoing communication into a dynamically determined quantity of multiple parts (e.g., by using a configurable erasure code), such as based on current information about available alternative paths, and another manager module associated with the destination may receive at least some of the multiple parts and decode them into the original outgoing communication, which is then provided to the destination.

31 Claims, 11 Drawing Sheets

(56) References Cited

U.S. PATENT DOCUMENTS

| | | | |
|---|---|---|---|
| 2004/0249916 A1* | 12/2004 | Graves et al. | 709/223 |
| 2005/0114507 A1 | 5/2005 | Tarui et al. | 709/224 |
| 2005/0120160 A1 | 6/2005 | Plouffe et al. | 711/1 |
| 2006/0184936 A1 | 8/2006 | Abels et al. | 718/1 |
| 2007/0061441 A1 | 3/2007 | Landis et al. | |
| 2007/0078988 A1* | 4/2007 | Miloushev et al. | 709/227 |
| 2007/0133420 A1* | 6/2007 | Guven et al. | 370/238 |
| 2007/0280243 A1 | 12/2007 | Wray et al. | |
| 2008/0181136 A1* | 7/2008 | Watanabe et al. | 370/255 |
| 2008/0189429 A1* | 8/2008 | DaCosta | 709/231 |
| 2008/0225875 A1 | 9/2008 | Wray et al. | |
| 2008/0240122 A1 | 10/2008 | Richardson et al. | |
| 2009/0003353 A1 | 1/2009 | Ding et al. | |
| 2009/0046733 A1 | 2/2009 | Bueno et al. | |
| 2010/0050057 A1* | 2/2010 | Luby | 714/776 |
| 2010/0107162 A1* | 4/2010 | Edwards et al. | 718/1 |

OTHER PUBLICATIONS

"Grid Computing Solutions," Sun Microsystems, Inc., retrieved May 3, 2006, from http://www.sun.com/software/grid, 3 pages.

"Grid Offerings," Java.net, retrieved May 3, 2006, from http://wiki.java.net/bin/view/Sungrid/OtherGridOfferings, 8 pages.

"MPLS-enabled VPN Services," Data Connection, retrieved Jan. 26, 2007, from http://www.dataconnection.com/solutions/vpn_vlan.htm, 1 page.

"Recent Advances Boost System Virtualization," eWeek.com, retrieved May 3, 2006, from http://www.eweek.com/article2/0,1895,1772626,00.asp, 5 pages.

"Scalable Trust of Next Generation Management (STRONGMAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Reverse Firewall™: Defeating DDoS Attacks Emerging from Local Area Networks," Cs3, Inc., retrieved Nov. 11, 2005, from http://www.cs3-inc.com/rfw.html, 4 pages.

"The Softricity Desktop," Softricity, retrieved May 3, 2006, from http://www.softricity.com/products/, 3 pages.

Bellovin, S., "Distributed Firewalls," Nov. 1999, issue of ;login:, pp. 37-39, retrieved Nov. 11, 2005, http://www.cs.columbia.edu/~smb/papers/distfw.html, 10 pages.

Blaze, M., "Using the KeyNote Trust Management System," Mar. 1, 2001, retrieved May 17, 2006, from http://www.crypto.com/trustmgt/kn.html, 4 pages.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Chown, T., "Use of VLANs for IPv4-IPv6 Coexistence in Enterprise Networks: draft-ietf-v6ops-vlan-usage-01," IPv6 Operations, University of Southampton, Mar. 6, 2006, retrieved Jun. 15, 2007, from http://tools.ietf.org/html/draft-ietf-v6ops-vlan-usage-01, 13 pages.

Coulson, D., "Network Security Iptables," Apr. 2003, Linuxpro, Part 2, retrieved from http://davidcoulson.net/writing/lxf/39/iptables.pdf, 4 pages.

Coulson, D., "Network Security Iptables," Mar. 2003, Linuxpro, Part 1, retrieved from http://davidcoulson.net/writing/lxf/38/iptables.pdf, 4 pages.

Demers, A., "Epidemic Algorithms for Replicated Database Maintenance," 1987, Proceedings of the sixth annual ACM Symposium on Principles of distributed computing, Vancouver, British Columbia, Canada, Aug. 10-12, 1987, 12 pages.

Gruener, J., "A vision of togetherness," May 24, 2004, NetworkWorld, retrieved May 3, 2006, from, http://www.networkworld.com/supp/2004/ndc3/0524virt.html, 9 pages.

Ioannidis, S., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.

Kenshi, P., "Help File Library: Iptables Basics," Justlinux, retrieved Dec. 1, 2005, from http://www.justlinux.com/nhf/Security/Iptables_Basics.html, 4 pages.

Shankland, S., "Sun to buy start-up to bolster N1," Jul. 30, 2003, CNet News.com, retrieved May 3, 2006, http://news.zdnet.com/2100-35213_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Townsley, M., et al., "Encapsulation of MPLS over Layer 2 Tunneling Protocol Version 3: draft-ietf-mpls-over-l2tpv3-03.txt," Network Working Group, Nov. 2006, retrieved Jun. 15, 2007, from http://tools.ietf.org/html/draft-ietf-mpls-over-l2tpv3-03, 12 pages.

Van Renesse, R., "Astrolabe: A Robust and Scalable Technology for Distributed System Monitoring, Management, and Data Mining," May 2003, ACM Transactions on Computer Systems (TOCS), 21(2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtualiron®, retrieved May 3, 2006, from http://www.virtualiron.com/, 1 page.

Waldspurger, C.A., "Spawn: A Distributed Computational Economy," Feb. 1992, IEEE Transactions on Software Engineering, 18(2):103-117, 15 pages.

"Anycast," retrieved on Mar. 16, 2009, from http://en.wikipedia.org/wiki/Anycast, 4 pages.

"Load Balancing (Computing)," retrieved on Mar. 16, 2009, from http://en.wikipedia.org/wiki/Load_balancing_(computing), 5 pages.

"Mobile IP," retrieved on Dec. 19, 2008, from http://en.wikipedia.org/wiki/Mobile_ip, 3 pages.

"Round Robin DNS," retrieved on Dec. 17, 2008, from http://en.wikipedia.org/wiki/Round_robin_DNS, 2 pages.

"Virtual IP Address," retrieved on Dec. 17, 2008, from http://www.answers.com/topic/virtual-ip-address-1, 2 pages.

"VMware VMotion," retrieved on Mar. 16, 2009, from http://www.vmware.com/products/vi/vc/vmotion.html. 2 pages.

"VMWare Storage VMotion," retrieved on Mar. 16, 2009, from http://www.vmware.com/products/vi/storage_vmotion.html. 2 pages.

Clark, C., et al. "Live Migration of Virtual Machines," retrieved on Mar. 16, 2009, from http://www.cl.cam.ac.uk/research/srg/netos/papers/2005-migration-nsdi-pre.pdf, 14 pages.

Roberts, L., "A Radical New Router," Jul. 2009, retrieved Mar. 2, 2010, from http://spectrum.ieee.org/computing/networks/a-radical-new-router/0, 10 pages.

Fujimura, A., et al., "Network Coding vs. Erasure Coding: Reliable Multicast in Ad Hoc Networks," Proceedings of the Second Annual Conference of the International Technology Alliance, London UK, Sep. 2008, 2 pages.

Widmer, J., et al., "Network Coding for Efficient Communication in Extreme Networks," SIGCOMM '05 Workshop, Aug. 22-26, 2005, Philadelphia, PA, U.S.A, 2005, 8 pages.

"Link Aggregation," retrieved on Jan. 1, 2010, from http://en.wikipedia.org/wiki/802.3ad, 5 pages.

\* cited by examiner

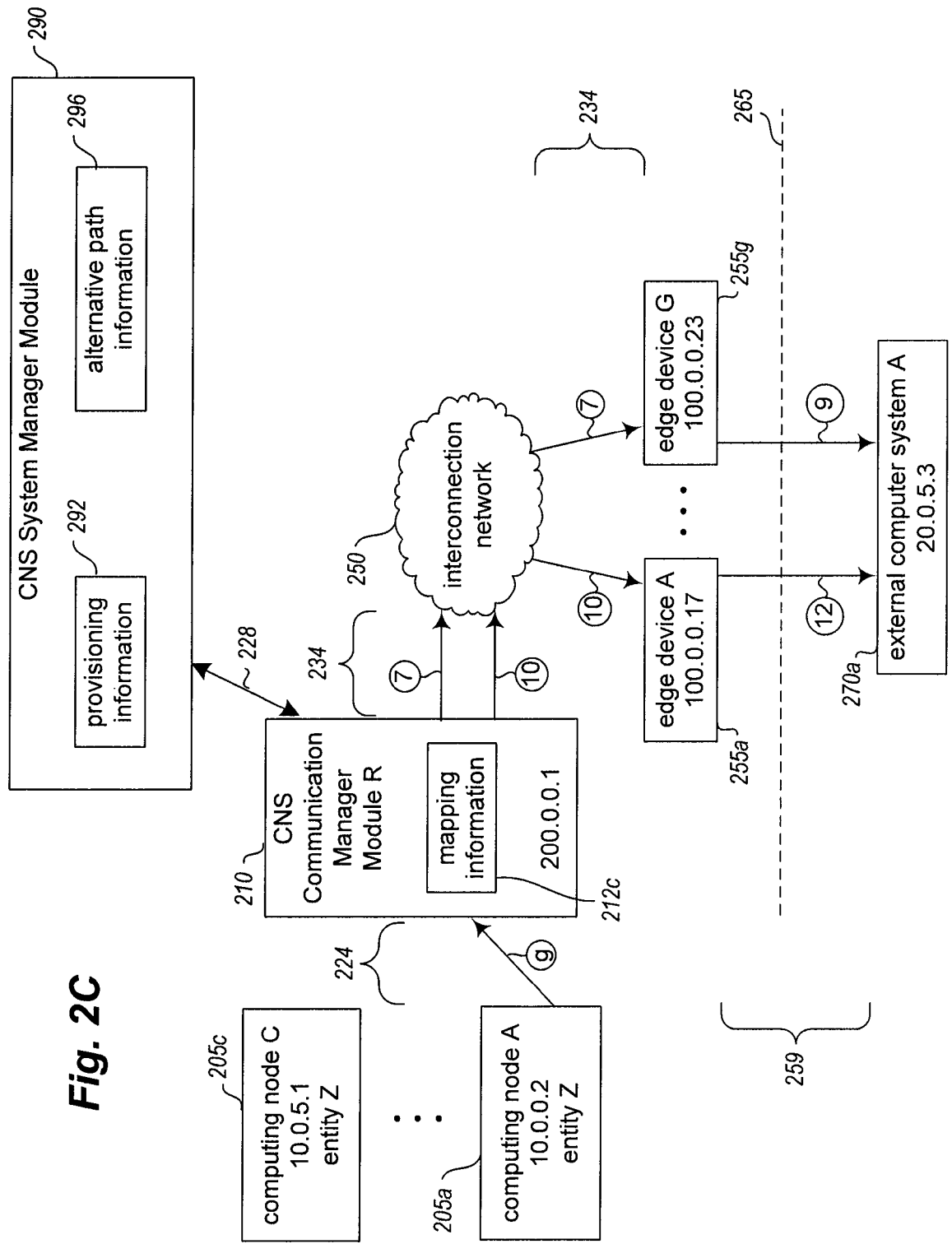

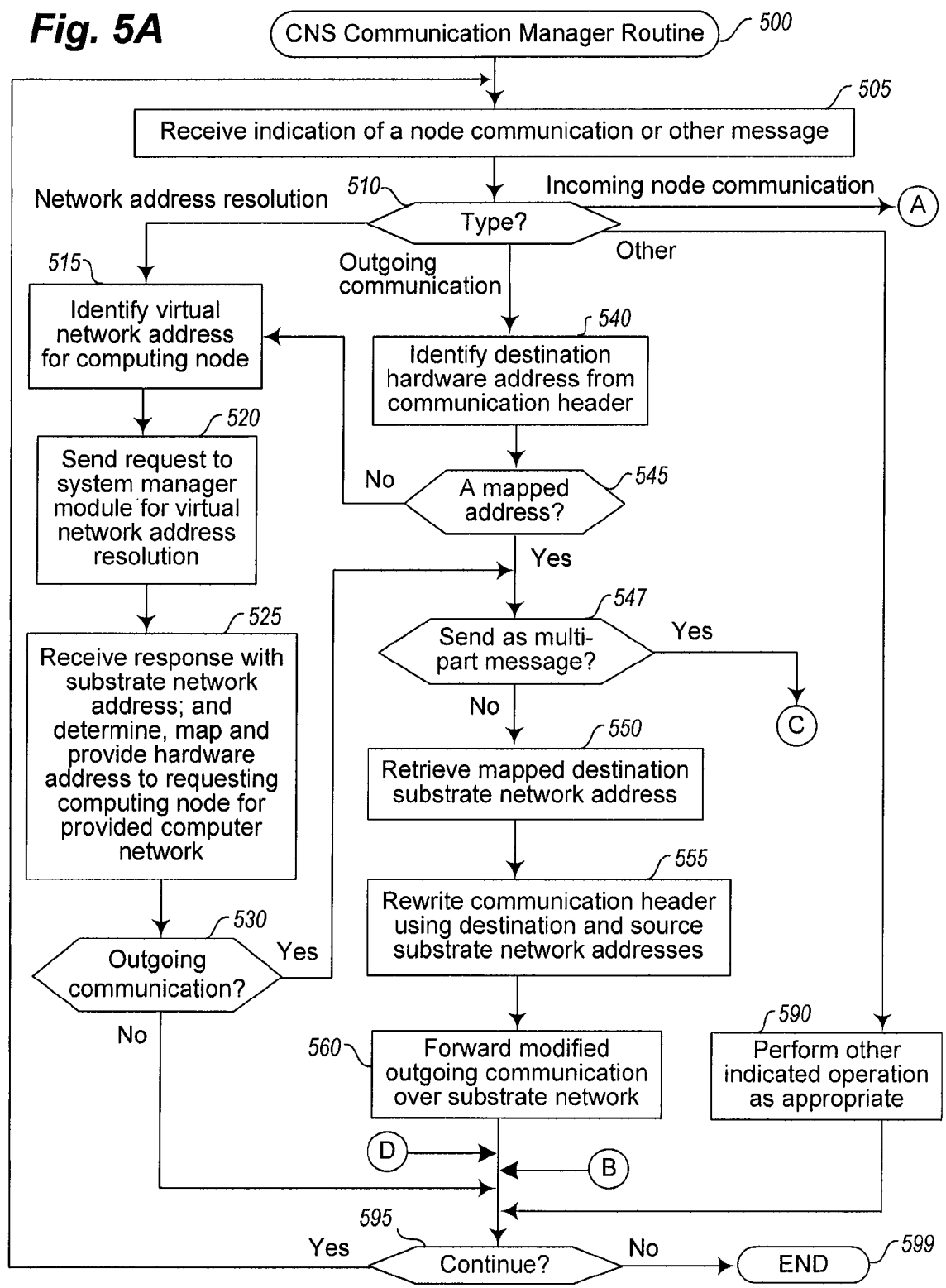

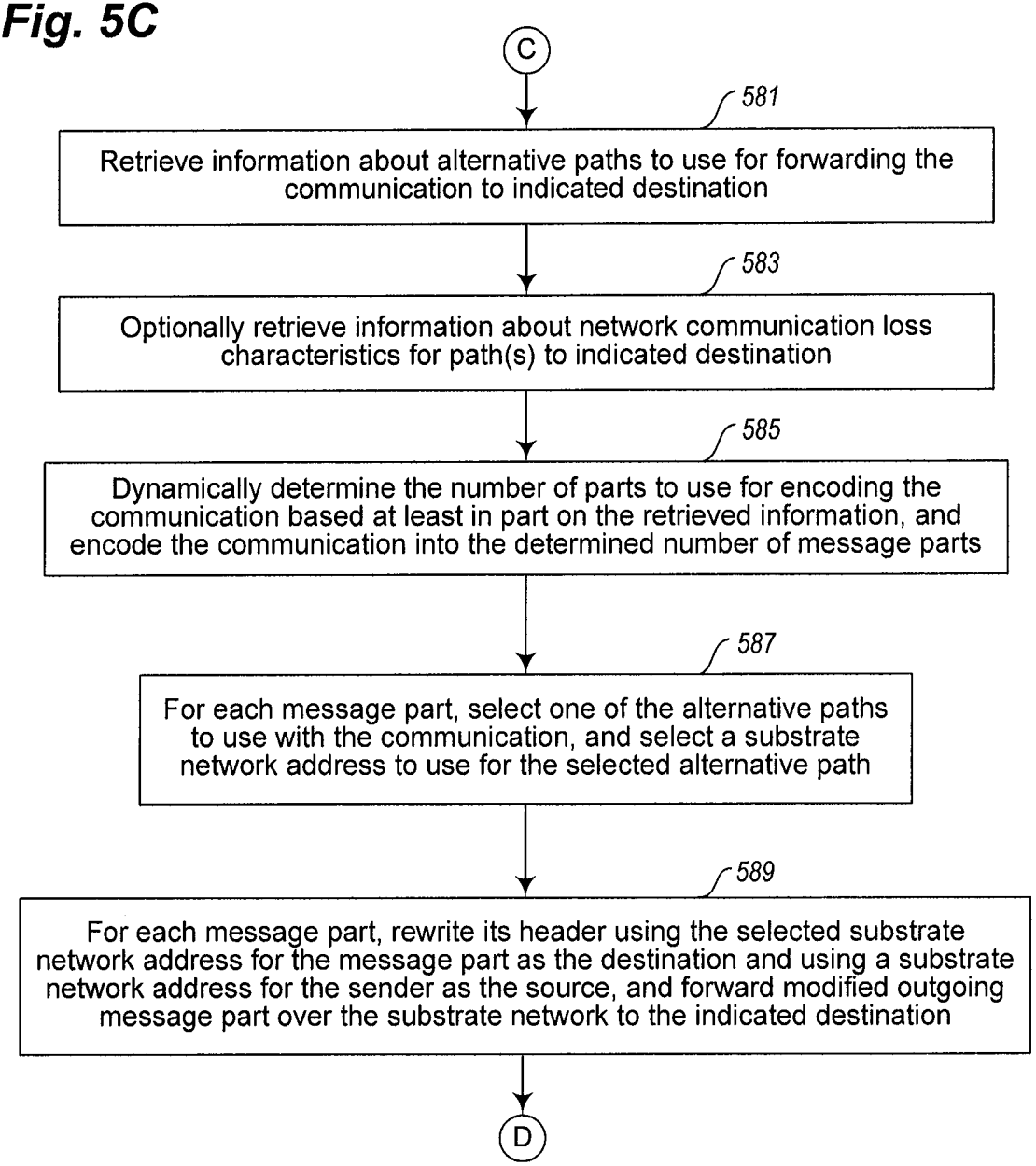

US 8,612,627 B1

MANAGING ENCODED MULTI-PART COMMUNICATIONS FOR PROVIDED COMPUTER NETWORKS

BACKGROUND

Many companies and other organizations operate computer networks that interconnect numerous computing systems to support their operations, with the computing systems alternatively co-located (e.g., as part of a private local area network, or "LAN") or instead located in multiple distinct geographical locations (e.g., connected via one or more other private or shared intermediate networks). For example, data centers housing significant numbers of interconnected co-located computing systems have become commonplace, such as private data centers that are operated by and on behalf of a single organization, as well as public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIGS. 2A-2D illustrate examples of managing communications between computing nodes of a managed virtual overlay computer network.

FIGS. 5A-5C illustrate a flow diagram of an example embodiment of a CNS Communication Manager routine.

DETAILED DESCRIPTION

Figure 1A:
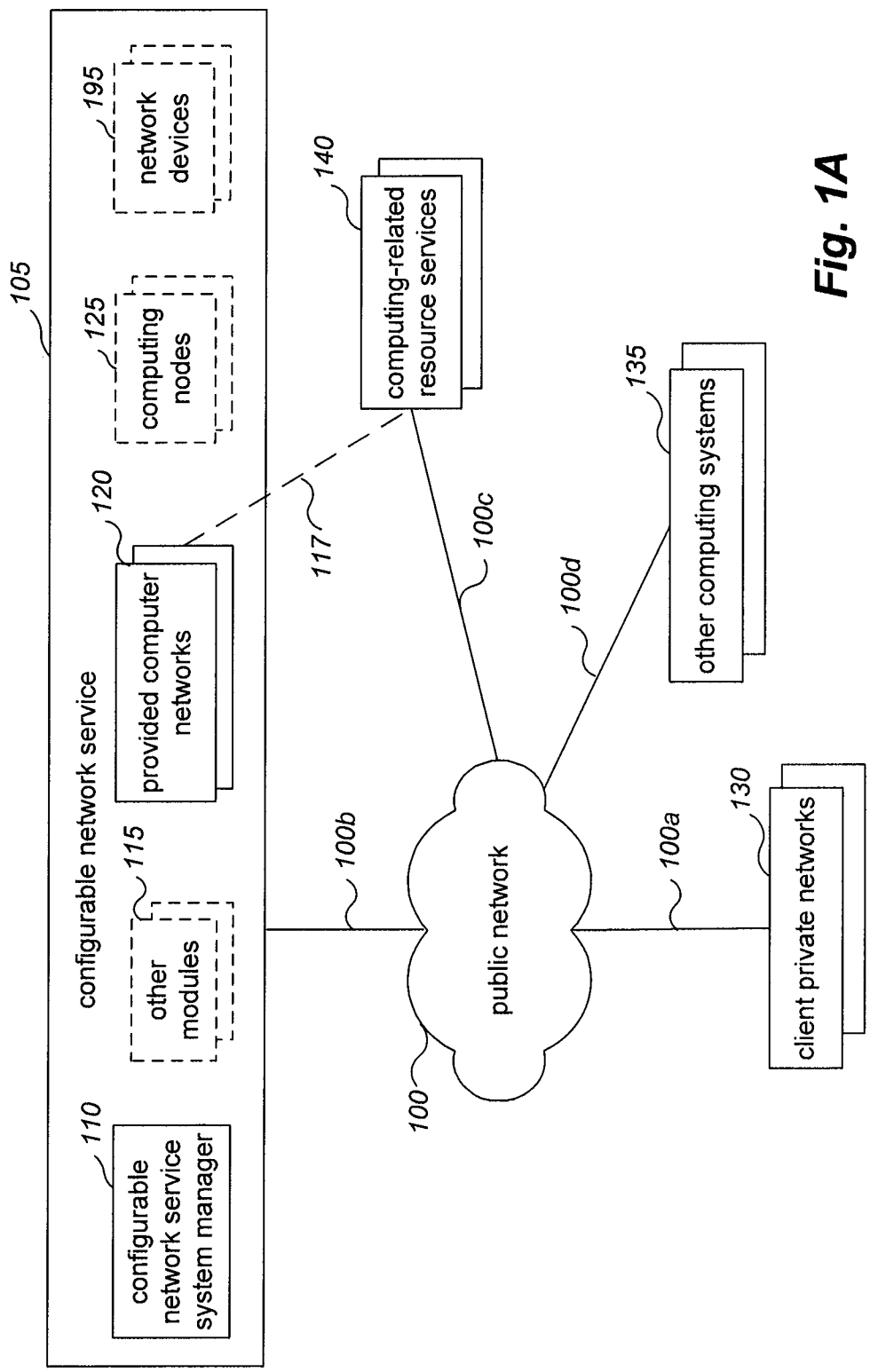
FIGS. 1A and 1B are network diagrams illustrating example embodiments of managing communications for computing nodes belonging to a managed computer network.

Techniques are described for providing managed computer networks, such as for computer networks that are managed and provided on behalf of users or other entities. Such managed computer networks may in some embodiments be provided by a configurable network service to users or other entities who are customers (e.g., for a fee) or otherwise clients of the configurable network service, such as to remote clients that access the configurable network service and/or the provided managed computer networks from remote locations over one or more intervening networks (e.g., over the Internet). In at least some embodiments, the techniques include managing communications for various computing nodes of a managed computer network, including in situations in which multiple alternative network paths are available to use in forwarding communications from a source computing node to a destination. In particular, a manager module associated with such a source computing node may operate in at least some such embodiments to automatically determine to separate a particular outgoing packet or other outgoing communication into multiple parts (e.g., multiple packets) to be independently sent using two or more alternative network paths from the source computing node to the destination. As one example, the manager module may use a configurable erasure code to separate an outgoing communication into an automatically determined quantity of multiple parts, with the quantity of multiple parts being dynamically determined based at least in part on information about alternative network paths that are currently available to use. In at least some embodiments, some or all of the described techniques are automatically performed by embodiments of a System Manager ("SM") module and/or one or more communication manager modules, such as an SM module and multiple communication manager modules that are part of a network-accessible configurable network service.

Thus, managing communications for a managed computer network may in at least some embodiments include obtaining and using information about multiple alternative network paths that are available for use in forwarding communications from at least some source computing nodes to other destinations. For example, the computing nodes of the managed computer network may in some embodiments each have an associated communication manager module that manages communications to and/or from the computing node, and the communication manager module associated with a source computing node that is sending a packet or other outgoing communication to an indicated final destination may in at least some situations facilitate the sending of that communication based on information about multiple alternative network paths between the source computing node and the final destination. The actions of such a sending communication manager module may include, for example, retrieving information about the multiple alternative network paths between the source computing node and the final destination, and using that retrieved information to automatically determine whether and how to encode the communication into multiple parts to be distinctly sent to the final destination, with such multiple encoded parts of a communication being referred to generally herein as a multi-part message. Similarly, when a communication manager module associated with a destination computing node receives at least some of the multiple encoded parts of a multi-part message, such a destination communication manager module may attempt to decode the various received multiple message parts to re-create the original sent communication, and provide the resulting decoded original communication to the destination computing node. As discussed in greater detail below, in some embodiments a computing node may be one of multiple virtual machines hosted on a physical computer system, and the associated communication manager module may be provided by a virtual machine hypervisor monitor executing on the physical computing system to manage those hosted virtual machines.

The encoding of a communication into a multi-part message, and the corresponding decoding of the multi-part message back into the original communication, may be performed in various manners in various embodiments. For example, in at least some embodiments, an erasure code or other forward error correction code scheme may be used to perform the encoding and decoding for a multi-part message. Such erasure codes generally may be used to transform information having X pieces (e.g., X bytes) into a larger number Y pieces (e.g., Y bytes), with the original X pieces of information being recoverable from a specified subset Z of the Y pieces—in such situations, the ratio of X/Y may be referred to as the "code rate," and the ratio of Z/X may be referred to as the "reception efficiency." Thus, for example, an erasure code may be used to encode a packet or other outgoing communication into multiple packets that may each be transmitted separately, with the original packet or other outgoing communication being recoverable from a subset of the multiple packets (e.g., with a given packet transformed into 5 packets, of which 3 are needed to reconstruct the original packet; or into 6 packets, of which 4 are needed for reconstruction). Furthermore, at least some erasure codes are configurable, so as to enable selected code rates and/or selected reception efficiencies to dynamically be selected and used for a particular encoding/decoding. In other embodiments, other types of encoding and decoding schemes may be used, such as non-exclusive examples of other forward error correction code schemes, various compression/decompression schemes, various encryption/decryption schemes, etc. In addition, in some embodiments and situations, the encoding of a single part for a communication may include adding additional information into the encoded communication, such that the original communication may be decoded from a subset of the encoded communication. Such additional information and resulting encoding may have various forms, including using various types of error-correcting codes. As one example, the additional information that is added to such an encoded communication may include new information that was not previously present in the communication (e.g., a parity bit or checksum), while as another example, the additional information that is added to such an encoded communication may include one or more copies of some or all of the existing content of the communication (e.g., with the code rate of the encoded communication being 1.0).

As previously noted, in at least some embodiments, the determination of whether and/or how to encode an outgoing communication may be made based at least in part on information about alternative network paths that are available for use in forwarding the communication (or in forwarding one or more parts of a multi-part message that is encoded from the communication). For example, in at least some embodiments, a determination of how to encode an outgoing communication may be automatically made based at least in part on a quantity of alternative network paths that are available for use with the communication, such as to select a quantity of the multiple parts based on the quantity of alternative network paths (e.g., to select the quantity of multiple parts to be the same as the quantity of alternative network paths, such that each of the alternative network paths will be used to forward one of the multiple parts; to select the quantity of multiple parts to be a multiple of the quantity of alternative network paths, such that each of the alternative network paths will be used to forward the same quantity of two or more of the multiple parts; etc.). In other embodiments, different alternative network paths may be used to carry different quantities of the multiple parts for a multi-part message, such as to select particular alternative network paths to carry more (or less) parts (e.g., based on attributes of the selected alternative network paths, such as higher bandwidth, throughput and/or reliability than other non-selected alternative network paths), or instead in other manners (e.g., randomly). In addition, in some embodiments, a subset of one or more of the alternative network paths that are available may be selected for use with a particular communication (e.g., to minimize contention of alternative network paths that have high loads, to minimize use of unreliable alternative network paths, etc.), such that the determination of how to perform the encoding may instead be based on that subset of alternative network paths. Furthermore, if only a single network path is available between a sending computing node and a destination, an outgoing communication between the sending computing node and the destination will not be encoded into a multi-part message in some embodiments (although the outgoing communication may nonetheless be encoded in a single part that includes additional information, such as for error correction purposes), while in other embodiments such an outgoing communication may be encoded into a multi-part message in at least some situations (e.g., if the single alternative network path is unreliable), with the multiple parts individually sent along the single available network path.

In addition, in at least some embodiments, the automated determination of a particular quantity of multiple parts into which to encode a particular communication may be made in a dynamic manner at a time of the encoding based on a currently available quantity of available alternative network paths. Thus, if a particular sending computing node is sending multiple outgoing communications (e.g., a stream of packets) to a particular destination, different ones of the sent communications may be encoded in different manners based on a different quantity of alternative network paths that are available at the times of sending those communications. Such differences in the available alternative network paths at different times may be caused in various manners, such as based on particular network communication links becoming temporarily available or unavailable (e.g., based on a failure of an associated substrate network router device or other networking device), particular network communication links becoming administratively assigned to other uses (e.g., to temporarily assign a VPN connection between two geographical locations for dedicated use by one or more other computing nodes, such that it is unavailable to a current sending computing node), etc.

The determination of whether and/or how to encode an outgoing communication may also be made in at least some embodiments based at least in part on information about operational characteristics of one or more alternative paths through the network, whether instead of or in addition to information about a quantity of the available alternative network paths. For example, the use of an erasure code to encode an outgoing communication into a multi-part message may provide benefits in environments in which one or more of the multiple parts may not be successfully received at the destination in a timely manner (e.g., such as due to packets being dropped or otherwise lost for one or more of the alternative network paths that are used to forward the multi-part message; such as due to one or more network links being subject to temporary unavailability, such as for wireless connections; etc.), since the original communication may be decoded using only a subset of the multiple parts. Accordingly, in at least some embodiments, one or more measures of the reliability of one or more alternative network paths (e.g., a rate of network packets that are lost during transit) may be used to determine whether and/or how to encode a particular outgoing communication, such as to select a quantity of the multiple parts for the encoding based on an assessed value of the reliability of one or more of the available alternative network paths (e.g., if the assessed reliability of the alternative network paths decreases, to decrease the code rate and/or the reception efficiency, or to more generally increase the quantity of multiple parts or decrease the size of the subset of the multiple parts needed to decode the original communication). One non-exclusive example of a network operation characteristic that may be used in some embodiments is a Bit Error Rate ("BER") measure. In other embodiments, network operation characteristics other than reliability may be used as part of determining a particular encoding to use. In addition, in at least some embodiments, the automated determination of a particular quantity of multiple parts into which to encode a particular communication based on network operation characteristics may be made in a dynamic manner at a time of the encoding based on available information about the current network operation characteristics of one or more of the available alternative network paths.

The alternative network paths that are identified and used between two locations (e.g., the location of a sending computing node and the location of an intended destination for a communication sent by the sending computing node) may have various forms in various embodiments. For example, in some situations, a first group of one or more computing nodes may be co-located at a first geographical location (e.g., in a first data center), and a second group of one or more other computing nodes may be co-located at a distinct second geographical location (e.g., in a second data center), such as to be part of a wide area network ("WAN"). In such situations, multiple alternative communication links (e.g., leased lines, networks of different providers, etc.) may exist between those two geographical locations, and may each be used as part of an alternative network path between a first computing node at the first geographical location and a second computing node at the second geographical location. Furthermore, when a group of one or more computing nodes are co-located at a first location, the computer network(s) at the first location may further include one or more edge devices or other edge modules that assist in forwarding communications between the first location and other external computer systems at one or more other locations, such as by each being associated with one or more of the alternative communication links from the first location to the second location, and with some or all of the edge modules optionally providing various additional functionality to manage communications (e.g., firewall functionality; network address translation ("NAT") functionality; port address translation ("PAT") functionality; intrusion detection functionality; intrusion prevention functionality; content analysis functionality; WAN acceleration or other network acceleration functionality; virtual private network ("VPN") connection functionality; etc.). Accordingly, in such situations, a particular part of a multi-part message being sent from the first location to another location may be directed to a particular alternative network path by sending that message part via a particular one of the multiple alternative communication links departing the first location, such as by forwarding that message part to a particular one of multiple edge modules at the first location that is associated with that particular alternative communication link.

In other embodiments and situations, alternative network paths between a sending computing node and an indicated destination may be based at least in part on network communication links that have forms other than links between two geographical locations. For example, a particular local area network or other computer network may include multiple links or other connections between two or more devices connected to the network, such as multiple alternative cables connecting a physical computer rack and a particular networking device; etc.—in such situations, a particular part of a multi-part message being sent between the two or more devices may be directed to a particular one of the alternative connections as part of a particular alternative network path. In addition, in some situations, a particular physical computing system may include two or more distinct network interfaces that connect the computing system to a computer network, with each of the network interfaces being an end point of one or more network paths that are distinct from the network paths for the other network interface(s). If so, a particular part of a multi-part message being sent to or from that computing system may be sent from or directed to a particular one of the network interfaces, such as by using a distinct network address assigned to the selected network interface. Such distinct network interfaces connecting a computing system to a computer network may include one or more distinct physical network interfaces (e.g., with each having a distinct NIC, or network interface card, or other physical connection between the computing system and computer network) and/or one or more distinct logical network interfaces (e.g., with each having a distinct network address, and with the one or more distinct network addresses being associated with one or more distinct physical network interfaces). In addition, the selection of a particular one of multiple alternative communication links for use as part of an alternative network path for a communication may be performed in various manners in various embodiments. For example, in some embodiments, the multiple alternative communication links may be treated as multiple alternative intermediate destinations along different alternative network paths, and a particular message part or other communication may be directed to a particular intermediate destination for further forwarding on to one or more final destinations. Such intermediate destinations may each, for example, be assigned a distinct network address, such as from a CIDR ("Classless Inter-Domain Routing") block of contiguous network addresses, or instead from another group of multiple network addresses. If so, a particular one of the multiple alternative intermediate destinations may be sent a particular communication by using its assigned network address, with the particular alternative intermediate destination being selected in various manners (e.g., by selecting the associated network address using a consistent hash function based on information included in the communication, such as the source and destination network addresses, or by instead selecting the network address in other manners, such as randomly). In other embodiments, different parts of a multi-part message may be distributed along multiple alternative network paths in manners without selecting a particular alternative network path for each part of the multi-part message, such as with each of one or more of the multiple parts being randomly sent via one of multiple alternative network paths, or by sending some or all message parts to another network device or module (e.g., a load balancer) that selects one of multiple alternative communication links.

Furthermore, the final destinations to which communications are forwarded via the network paths may be of a variety of types in various embodiments. For example, a computing node of a managed computer network at a first geographical location may send communications to final destinations at other geographical locations (e.g., as part of one or more WANs), such as another computing node of the same managed computer network that is located at a remote second location, a computer system at another location that is not part of the same managed computer network (e.g., a computer system that is part of a remote computer network of the client to whom the managed computer network is provided), etc. Alternatively, the final destinations may be any computing nodes or other target devices that are at the same geographical location as the sending computing node, or more generally that are otherwise accessible via one or more computer networks at that location.

To facilitate the encoding of communications based on information about available alternative network paths, embodiments of the configurable network service may obtain such information in various manners in various embodiments. For example, the configurable network service may obtain information about the initial physical configuration of some or all of the network(s) between computing nodes, so as to identify potential alternative communication links between at least some locations, and may further track changes to that physical configuration (e.g., to track when particular network communication links become unavailable or available). In addition, the configurable network service may optionally obtain information about network operation characteristics of particular network communication links or paths, such as by monitoring communications that use those links/paths, or by otherwise obtaining the network operation characteristics information. For example, one or more communication manager modules may track or otherwise obtain information about the bandwidth, throughput, latency, load and/or other network operation characteristics associated with some or all of the alternative network communication links and/or network paths (e.g., based at least in part on other communications previously sent via those links/paths). Additional details related to various techniques for managing communications for managed computer networks that are forwarded via alternative network paths are included below.

By sending at least some communications as multi-part messages, various benefits may be obtained in at least some embodiments. As one potential benefit, when a multi-part message is sent using multiple alternative network paths, the sending of that multi-part message may occur more rapidly (e.g., receive a greater effective throughput) than if the original communication was sent without being encoded into a multi-part message. As a simple example, if a communication of 5000 bytes is encoded into a multi-part message with 5 packets of 1500 bytes each, which can be decoded from any 4 of the 5 packets, and the 5 packets are each simultaneously transmitted along one of five alternative network communication links that each have a bandwidth of 10,000 bytes per second, the entire multi-part message may be sent in 0.15 seconds, rather than 0.50 seconds to serially transmit the entire communication along a single one of the network communication links. In addition, some benefits may be obtained with respect to load balancing when using a multi-part message, such that each of the alternative communication links in the prior example is used for only 0.15 seconds, rather than rendering one of the network communication links unavailable for the longer 0.50 seconds if the communication is sent without encoding it into a multi-part message. As another benefit, enhanced security may be obtained in some situations when using a multi-part message, such that even if the single message part that is transmitted along one of the alternative communication links in the prior example is intercepted by a malicious user, the original communication may not be obtained by that malicious user, in contrast to the entire original communication being potentially revealed if it is sent without encoding it into a multi-part message along that single communication link and is intercepted. Such enhanced security may be of particular use if the information being sent is particularly valuable, such as, for example, financial data, information corresponding to the ongoing execution of a computing node (e.g., one or more memory pages of the computing node, such as if the execution of one or more programs on the computing node is being migrated to another computing node that is the destination of the communication), etc. Furthermore, some benefits may be obtained with respect to communication reliability when using a multi-part message, such that in the prior example, the original communication may be decoded at the destination even if one of the alternative communication links drops one of the five packets being transmitted, in contrast to the communication not being received at the destination if the single network communication link used to transmit the non-encoded communication is that network communication link and drops that communication. Moreover, such benefits with respect to communication reliability may be obtained in at least some situations even if the multi-part message is transmitted along a single network path.

As noted above, in at least some embodiments, the described techniques include managing communications for a managed computer network being provided, any may have particular benefits in embodiments in which the managed computer network is a virtual computer network that is overlaid on one or more underlying substrate computer networks. In such embodiments, communications may be encoded in various manners before being sent over an underlying substrate network (e.g., to use substrate network addresses for the communication source and/or final destination in the encoded communication that are distinct from virtual network addresses used for the communication source and/or final destination in the original pre-encoded communication), and the described techniques may be used in conjunction with such encoded communications (e.g., by using the pre-encoded virtual network addresses for the source and/or final destination to identify particular alternative network paths between the source and final destination, and/or by using an encoded substrate network address to direct a communication along a particular selected path in the substrate network), as discussed in greater detail below. Before discussing some additional details of managing such communications in particular manners, however, some aspects of such managed computer networks in at least some embodiments are introduced.

In particular, a managed computer network between multiple computing nodes may be provided in various ways in various embodiments, such as in the form of a virtual computer network that is created as an overlay network using one or more intermediate physical networks that separate the multiple computing nodes. In such embodiments, the intermediate physical network(s) may be used as a substrate network on which the overlay virtual computer network is provided, with communications between computing nodes of the overlay virtual computer network being passed over the intermediate physical network(s), but with the computing nodes being unaware of the existence and use of the intermediate physical network(s) in at least some such embodiments. For example, the multiple computing nodes may each have a distinct physical substrate network address that corresponds to a location of the computing node within the intermediate physical network(s), such as a substrate IP ("Internet Protocol") network address (e.g., an IP network address that is specified in accordance with IPv4, or "Internet Protocol version 4," or in accordance with IPv6, or "Internet Protocol version 6," such as to reflect the networking protocol used by the intermediate physical networks). In other embodiments, a substrate network on which a virtual computer network is overlaid may itself include or be composed of one or more other virtual computer networks, such as other virtual computer networks implemented by one or more third parties (e.g., by an operator or provider of Internet or telecom infrastructure).

When computing nodes are selected to participate in a managed computer network that is being provided on behalf of a user or other entity and that is a virtual computer network overlaid on a substrate network, each computing node may be assigned one or more virtual network addresses for the provided virtual computer network that are unrelated to those computing nodes' substrate network addresses, such as from a range of virtual network addresses used for the provided virtual computer network—in at least some embodiments and situations, the virtual computer network being provided may further use a networking protocol that is different from the networking protocol used by the substrate network (e.g., with the virtual computer network using the IPv4 networking protocol, and the substrate computer network using the IPv6 networking protocol). The computing nodes of the virtual computer network inter-communicate using the virtual network addresses (e.g., by sending a communication to another destination computing node by specifying that destination computing node's virtual network address as the destination network address for the communication), but the substrate network may be configured to route or otherwise forward communications based on substrate network addresses (e.g., by physical network router devices and other physical networking devices of the substrate network). If so, the overlay virtual computer network may be implemented from the logical edge of the intermediate physical network(s), by modifying the communications that enter the intermediate physical network(s) to use substrate network addresses that are based on the networking protocol of the substrate network, and by modifying the communications that leave the intermediate physical network(s) to use virtual network addresses that are based on the networking protocol of the virtual computer network. Additional details related to the provision of such an overlay virtual computer network are included below.

In at least some embodiments, a network-accessible configurable network service ("CNS") is provided by a corresponding CNS system, and the CNS system provides managed overlay virtual computer networks to remote customers (e.g., users and other entities), such as by providing and using numerous computing nodes that are in one or more geographical locations (e.g., in one or more data centers) and that are inter-connected via one or more intermediate physical networks. The CNS system may use various communication manager modules at the edge of the one or more intermediate physical networks to manage communications for the various overlay virtual computer networks as they enter and leave the intermediate physical network(s), and may use one or more system manager modules to coordinate other operations of the CNS system. For example, to enable the communication manager modules to manage communications for the overlay virtual computer networks being provided, the CNS system may track and use various information about the computing nodes of each virtual computer network being managed, such as to map the substrate physical network address of each such computing node to the one or more overlay virtual network addresses associated with the computing node. Such mapping and other information may be stored and propagated in various manners in various embodiments, including centrally or in a distributed manner, as discussed in greater detail below.

Furthermore, in order to provide managed virtual computer networks to users and other entities in a desired manner, the CNS system allows users and other entities to interact with the CNS system in at least some embodiments to configure a variety of types of information for virtual computer networks that are provided by the CNS system on behalf of the users or other entities, and may track and use such configuration information as part of providing those virtual computer networks. The configuration information for a particular managed virtual computer network having multiple computing nodes may include, for example, one or more of the following non-exclusive list: a quantity of the multiple computing nodes to include as part of the virtual computer network; one or more particular computing nodes to include as part of the virtual computer network; a range or other group of multiple virtual network addresses to associate with the multiple computing nodes of the virtual computer network; particular virtual network addresses to associate with particular computing nodes or particular groups of related computing nodes; a type of at least some of the multiple computing nodes of the virtual computer network, such as to reflect quantities and/or types of computing resources to be included with or otherwise available to the computing nodes; a geographic location at which some or all of the computing nodes of the virtual computer network are to be located; etc. In addition, the configuration information for a virtual computer network may be specified by a user or other entity in various manners in various embodiments, such as by an executing program of the user or other entity that interacts with an API ("application programming interface") provided by the CNS system for that purpose and/or by a user that interactively uses a GUI ("graphical user interface") provided by the CNS system for that purpose.

FIG. 1A is a network diagram illustrating an example of a network-accessible service that provides client-configurable managed computer networks to clients. In particular, in this example, at least some of the managed computer networks may be virtual computer networks, such as virtual computer networks that are created and configured as network extensions to existing remote private computer networks of clients, although in other embodiments the managed computer networks may have other forms and/or be provided in other manners. After configuring such a managed computer network being provided by the network-accessible service, a user or other client of the network-accessible service may interact from one or more remote locations with the provided computer network, such as to execute programs on the computing nodes of the provided computer network, to dynamically modify the provided computer network while it is in use, etc.

In particular, in the illustrated example of FIG. 1A, a configurable network service ("CNS") 105 is available that provides functionality to clients (not shown) over one or more public networks 100 (e.g., over the Internet) to enable the clients to access and use managed computer networks provided to the clients by the CNS 105, including to enable the remote clients to dynamically modify and extend the capabilities of their remote existing private computer networks using cloud computing techniques over the public network 100. In the example of FIG. 1A, a number of clients interact over the public network 100 with a system manager module 110 of the CNS 105 to create and configure various managed computer networks 120 being provided by the CNS 105, with at least some of the provided computer networks 120 optionally being private computer network extensions to remote existing client private networks 130, and with at least some such of those provided computer network extensions 120 being configured to enable access from one or more corresponding client private networks 130 over the public network 100 (e.g., private access via VPN connections established over interconnections 100a and 100b, or access via other types of private or non-private interconnections). In this example embodiment, the system manager module 110 assists in providing functionality of the CNS 105 to the remote clients, such as in conjunction with various optional other modules 115 of the CNS 105 (e.g., various communication manager modules), as well as various optional computing nodes 125 and/or network devices 195 (e.g., substrate network router devices, edge devices, etc.) that are used by the CNS 105 to provide the managed computer networks 120. In at least some embodiments, the CNS system manager module 110 may execute on one or more computing systems (not shown) of the CNS 105, and may provide one or more APIs that enable remote computing systems to programmatically interact with the module 110 to access some or all functionality of the CNS 105 on behalf of clients (e.g., to create, configure, and/or initiate use of managed computer networks 120). In addition, in at least some embodiments, clients may instead manually interact with the module 110 (e.g., via a GUI provided by the module 110) to perform some or all such actions.

The public network 100 in FIG. 1A may be, for example, a publicly accessible network of linked networks, possibly operated by distinct parties, such as the Internet. The remote client private networks 130 may each include one or more existing private networks, such as a corporate or other private network (e.g., home, university, etc.) that is partially or wholly inaccessible to non-privileged users, and that includes computing systems and/or other networked devices (not shown) of a client. In the illustrated example, the provided computer networks 120 each include multiple computing nodes (not shown), at least some of which may be from the plurality of optional computing nodes 125 provided by or otherwise under the control of the CNS 105, while in other embodiments at least some other computing systems 135 may be used to provide some or all computing nodes for one or more of the provided computer networks 120—such other computing systems 135 may, for example, be provided by or under control of the client for whom a computer network 120 that uses those other computing systems 135 is provided, or may be computing systems that are provided by third parties (e.g., for a fee). Each of the provided computer networks 120 may be configured in various ways by the clients for whom they are provided, and may each be a private computer network that is accessible only by the client that creates it, although in other embodiments at least some computer networks provided by the CNS 105 for clients may be publicly accessible. Similarly, while at least some of the provided computer networks 120 in the example may be extensions to remote client computer networks 130 that are private networks, in other embodiments the provided computer networks 120 may be standalone computer networks that are not extensions to other existing computer networks 130 and/or may be extensions to other client computer networks 130 that are not private networks.

Private access between a remote client private computer network 130 and a corresponding private computer network extension 120 provided for a client may be enabled in various ways, such as by establishing a VPN connection or other private connection between them that allows intercommunication over the public network 100 in a private manner. For example, the CNS 105 may automatically perform appropriate configuration on its computing nodes and other network devices to enable VPN access to a particular private network extension 120 of a client, such as by automatically configuring one or more VPN mechanisms hosted by the CNS 105 (e.g., software and/or hardware VPN mechanisms), and/or may automatically provide appropriate configuration information to the client (e.g., credentials, access points, and/or other parameters) to allow a VPN mechanism hosted on the remote client private network 130 (e.g., a software VPN endpoint that is provided by one of the multiple computing nodes of the provided network extension 120) to establish the VPN access. After VPN access has been appropriately enabled and/or configured, a VPN connection may be established between the remote client private network and the provided private network extension, such as initiated by the client using IPsec ("Internet Protocol Security") or other appropriate communication technologies (e.g., by establishing a VPN connection or other private connection to or between networks that use MPLS ("Multi Protocol Label Switching") for data transmission). In addition, in the illustrated example, various network-accessible remote resource services 140 may optionally be available to remote computing systems over the public network 100, including to computing nodes on the remote client private networks 130. The resource services 140 may provide various functionality to the remote computing nodes, such as for at least some of the resource services 140 to provide remote computing nodes with access to various types of network-accessible computing-related resources. Furthermore, at least some of the computer networks 120 that are provided by the CNS 105 may be configured to provide access to at least some of the remote resource services 140, with that provided access optionally appearing to computing nodes of the provided computer networks 120 as being locally provided via virtual connections 117 that are part of the provided computer networks 120, although the actual communications with the remote resource services 140 may occur over the public networks 100 (e.g., via interconnections 100b and 100c). In addition, in at least some embodiments, multiple distinct provided computer networks 120 may be configured to enable inter-access with each other.

The provided computer networks 120 may each be configured by clients in various manners. For example, in at least some embodiments, the CNS 105 provides various computing nodes 125 that are available for use with computer networks provided to clients, such that each provided computer network 120 may include a client-configured quantity of multiple such computing nodes that are dedicated for use as part of that provided computer network. In particular, a client may interact with the module 110 to configure a quantity of computing nodes to initially be included in a computer network provided for the client (e.g., via one or more programmatic interactions with an API provided by the CNS 105). In addition, the CNS 105 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client. In addition, in at least some embodiments, a client may interact with the module 110 to configure network addresses for a computer network provided for the client (e.g., via one or more programmatic interactions with an API provided by the CNS 105), and network addresses may later be dynamically added, removed or modified for a provided computer network of a client in at least some such embodiments, such as after the provided computer network has already been in use by the client. In addition, in at least some embodiments, a client may interact with the module 110 to configure network topology information for a computer network provided for the client (e.g., via one or more programmatic interactions with an API provided by the CNS 105), and such network topology information may later be dynamically modified for a provided computer network in at least some such embodiments, such as after the provided computer network has already been in use by the client. Furthermore, in at least some embodiments, a client may interact with the module 110 to configure various network access constraint information for a computer network provided for the client (e.g., via one or more programmatic interactions with an API provided by the CNS 105), and such network access constraint information may later be dynamically modified for a provided computer network in at least some such embodiments, such as after the provided computer network has already been in use by the client.

Network addresses may be configured for a provided computer network in various manners in various embodiments. For example, if a particular provided computer network that is being configured is an extension to an existing remote client computer network, the client may specify one or more address ranges (e.g., a Classless Inter-Domain Routing ("CIDR") address block) or other groups of network addresses for the provided computer network that are a subset of the network addresses used by the existing remote client computer network, such that at least some of the specified network addresses are used for the computing nodes of the provided computer network. Such configured network addresses may in some situations be virtual or private network addresses that are not directly addressable from computing systems on the public network 100 (e.g., if the existing remote client computer network and the corresponding provided network extension use network address translation techniques and/or virtual networking techniques for the client computer network and its provided network extension), while in other situations at least some of the configured network addresses may be external public network addresses that are directly addressable from computing systems on the public network 100 (e.g., a public network address that is a static Internet-routable IP address or other non-changing network address). In other embodiments, the CNS 105 may automatically select network addresses to be used for at least some computing nodes of at least some provided computer networks, such as based on network addresses that are available for use by the CNS 105, based on selecting network addresses that are related to network addresses used by remote existing computer networks corresponding to the provided computer networks, etc. Furthermore, if two or more of the computer networks provided by the CNS 105 are configured to enable inter-communications between the provided computer networks (e.g., for two or more computer networks provided to a single customer, such as for different departments or groups within a single organization; for two or more computer networks provided to two or more distinct customers; etc.), the CNS 105 may in some embodiments automatically select network addresses to be used for at least some computing nodes of those provided computer networks to facilitate the inter-communications, such as by using different network addresses for the various provided computer networks. In addition, in at least some embodiments in which the CNS 105 provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the CNS 105 manages the network addresses distinctly for each client, such that a first client may have a first computing node associated with a particular specified network address for the first client's provided computer network, while a distinct second client may have a distinct second computing node associated with the same particular specified network address for the second client's provided computer network. Once network addresses are configured or otherwise determined for a provided computer network, the CNS 105 may assign the network addresses to various of the computing nodes selected for the provided computer network, such as in a random manner, by using DHCP ("Dynamic Host Configuration Protocol") or other techniques for dynamic assignment of network addresses, etc.

Network topology information may be configured for a provided computer network in various manners in various embodiments. For example, a client may specify particular types of networking devices (e.g., routers, switches, etc.) and/or other network devices or nodes (e.g., load balancers, firewalls, proxies, network storage devices, printers, etc.) to be part of the provided computer network, and may specify interconnectivity information between networking devices and computing nodes. Furthermore, in at least some embodiments, the CNS 105 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CNS 105 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; constraints or other preferences based on the cost of obtaining use of particular computing nodes and/or for particular types of interactions with particular computing nodes, such as costs associated with providing data to and/or from those computing nodes; etc.). As discussed in greater detail elsewhere, in at least some embodiments, the interconnections and intercommunications between computing nodes of a provided computer network are managed using an underlying substrate network (not shown) of the CNS 105, and if so, some or all of the configured network topology information may be simulated or otherwise emulated in at least some such embodiments using the underlying substrate network and corresponding modules of the CNS 105. For example, each of the computing nodes provided by the CNS 105 may be associated with a node communication manager module of the CNS 105 that manages communications to and from its associated computing node(s), and if so, the associated communication manager module for a computing node may take various actions to emulate desired functionality of a network with respect to that computing node, as discussed in greater detail elsewhere.

Network access constraint information may also be configured for a provided computer network in various manners in various embodiments. For example, a client may specify information about whether and how some or all of the computing nodes of a provided computer network are allowed to communicate with other computing nodes of the provided computer network and/or with other external computing systems, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which access has been established, external to the provided computer network and any corresponding remote client computer network, etc.); types of other computing systems; etc. In a manner similar to that for network topology information, the CNS 105 may enforce network access constraint information for provided computer networks in various manners.

Thus, managed computer networks may be provided for clients in various manners in various embodiments, and may be configured to have various types of functionality in various embodiments.

In addition, in at least some embodiments, the computing nodes of the managed computer networks may be physical computing systems and/or may be virtual machines that are each hosted on one or more physical computing systems, and the communications that are handled for managed computer networks may each include one or more transmissions of data (e.g., one or more messages, one or more packets, one or more frames, one or more streams, etc.) in various formats. As previously noted, some or all computing nodes used for a particular provided overlay virtual computer network may in some embodiments be provided by the CNS system for use by users, while in other embodiments some or all such computing nodes may instead be provided by a user who uses those computing nodes. Furthermore, in at least some situations, an embodiment of the CNS system may be part of or otherwise affiliated with a program execution service (or "PES") that executes multiple programs on behalf of multiple customers or other users of the service, such as a program execution service that uses multiple computing systems on multiple physical networks (e.g., multiple physical computing systems and networks within a data center). In at least some such embodiments, virtual computer networks to which computing nodes belong may be selected based on associated users, such as based on the computing nodes executing programs on behalf of a user or other entity.

As previously noted, a virtual computer network may in some embodiments be provided as an overlay network that uses one or more intermediate physical networks as a substrate network, and one or more such overlay virtual computer networks may be implemented over the substrate network in various ways in various embodiments. For example, in at least some embodiments, communications between nodes of an overlay virtual computer network are managed by encoding and sending those communications over the substrate network without encapsulating the communications, such as by embedding virtual network address information for a computing node of the virtual computer network (e.g., the destination computing node's virtual network address) in a larger physical network address space used for a networking protocol of the one or more intermediate physical networks, while in other embodiments the communications are encoded in other manners (e.g., by storing virtual network address information from the pre-encoded communication in one or more header fields of the encoded communication or otherwise in a manner associated with the encoded communications, such as if the overlay virtual computer network and underlying substrate network use the same networking protocol). As one illustrative example, a virtual computer network may be implemented using 32-bit IPv4 network addresses, and those 32-bit virtual network addresses may be embedded as part of 128-bit IPv6 network addresses used by the one or more intermediate physical networks, such as by re-headering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual computer network and substrate computer network may be implemented using the same networking protocol (e.g., IPv4 or IPv6), and data transmissions sent via the provided overlay virtual computer network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay computer networks may be implemented using encapsulation of communications. Additional details related to SIIT are available at "Request For Comments 2765—Stateless IP/ICMP Translation Algorithm", February 2000, Internet Engineering Task Force ("IETF"), which is hereby incorporated by reference in its entirety. This document is also available at the time of filing at tools<dot>ietf<dot>org<slash>html<slash>rfc2765 (where <dot> and <slash> are replaced by "." and "/", respectively).

Furthermore, in addition to managing configured network topologies for provided virtual computer networks, the CNS system may use the described techniques to provide various other benefits in various situations, such as limiting communications to and/or from computing nodes of a particular virtual computer network to other computing nodes that belong to that virtual computer network. In this manner, computing nodes that belong to multiple virtual computer networks may share parts of one or more intermediate physical networks, while still maintaining network isolation for computing nodes of a particular virtual computer network. In addition, the use of the described techniques also allows computing nodes to easily be added to and/or removed from a virtual computer network, such as to allow a user to dynamically modify the size of a virtual computer network (e.g., to dynamically modify the quantity of computing nodes to reflect an amount of current need for more or less computing resources). Furthermore, the use of the described techniques also supports changes to an underlying substrate network—for example, if the underlying substrate network is expanded to include additional computing nodes at additional geographical locations, existing or new virtual computer networks being provided may seamlessly use those additional computing nodes, since the underlying substrate network will route communications to and from the substrate network addresses for those additional computing nodes in the same manner as for other previously existing substrate network computing nodes. In at least some embodiments, the underlying substrate network may be of any size (e.g., spanning multiple countries or continents), without regard to network latency between computing nodes at different locations.

At least some such benefits may similarly apply for logical sub-networks (or "subnets") that are specified for such a particular provided virtual computer network, with the substrate network functionality used to emulate various functionality corresponding to the specified logical subnets. For example, the use of the underlying substrate network may enable different computing nodes assigned to a particular logical subnet to be located at any position within the substrate network, with the substrate network forwarding communications to destination computing nodes based on those destination computing nodes' substrate network addresses. As such, the substrate network may support specified logical subnets or other configured network topology for a managed computer network, without any configuration for or other use of information about such specified logical subnets, and with the CNS system modules (e.g., communication manager modules) instead managing the corresponding functionality from the logical edges of the substrate network where the CNS system modules connect to the substrate network.

For illustrative purposes, some embodiments are described below in which specific types of computing nodes, networks, communications, network topologies, and configuration operations are performed. These examples are provided for illustrative purposes and are simplified for the sake of brevity, and the inventive techniques may be used in a wide variety of other situations, some of which are discussed below.

Figure 1B:
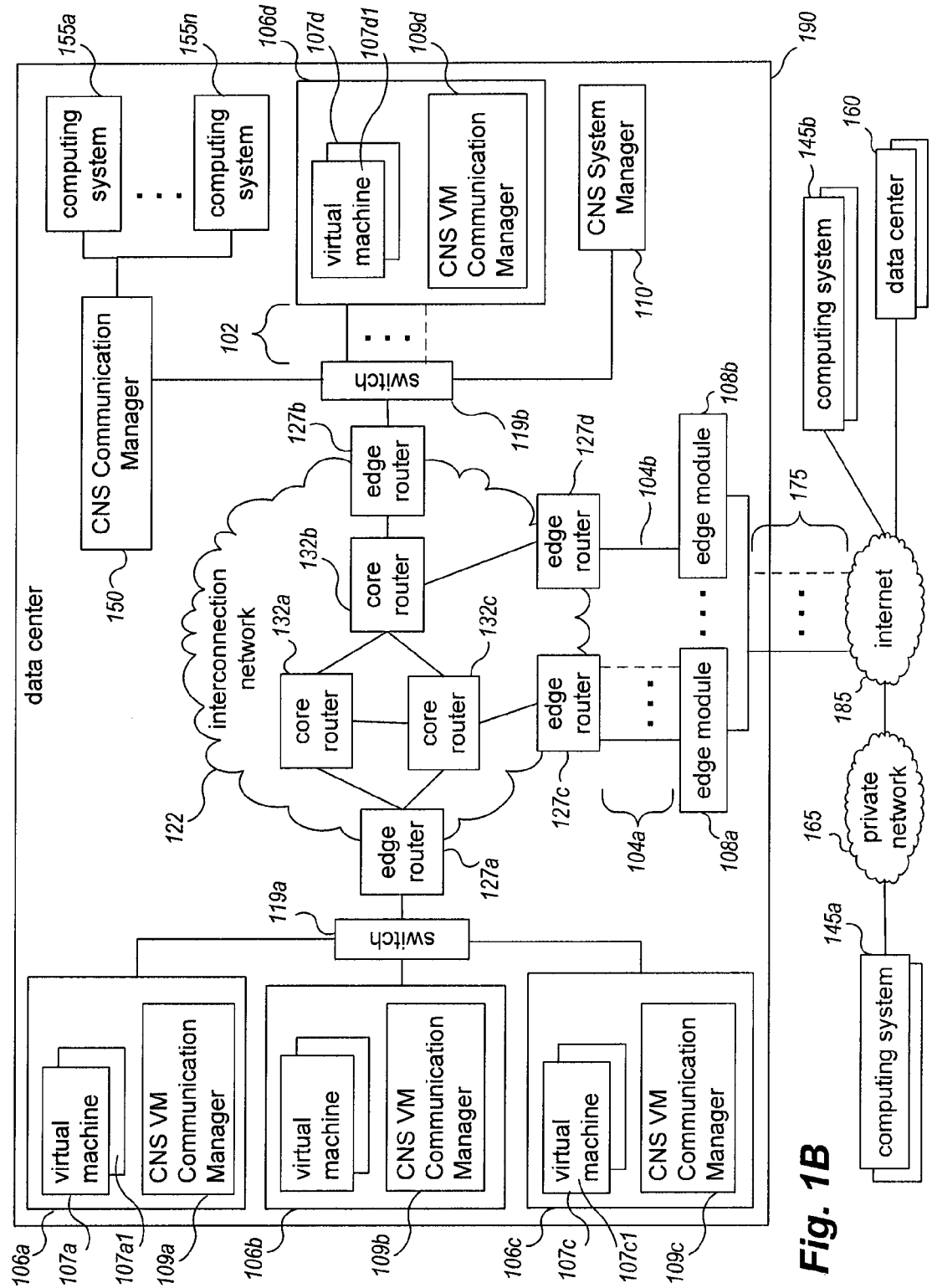

FIG. 1B is a network diagram illustrating an example embodiment of configuring and managing communications between computing nodes belonging to a virtual computer network, by overlaying the virtual computer network and the communications on one or more intermediate physical networks in a manner transparent to the computing nodes of the virtual computer network. In this example, the configuring and managing of the communications is facilitated by a system manager module and multiple communication manager modules of an example embodiment of the CNS system. The example CNS system may be used, for example, in conjunction with a publicly accessible program execution service (not shown), or instead may be used in other situations, such as with any use of virtual computer networks on behalf of one or more entities (e.g., to support multiple virtual computer networks for different parts of a business or other organization on a private network of the organization).

The illustrated example includes an example data center 190 with multiple physical computing systems operated on behalf of the CNS system. The example data center 190 is connected to an internet 185 external to the data center 190, which provides access to one or more computing systems 145a via private network 165, to one or more other globally accessible data centers 160 that each have multiple computing systems (not shown), and to one or more other computing systems 145b. The internet 185 may be, for example, a publicly accessible network of networks (possibly operated by various distinct parties), such as the Internet, and the private network 165 may be, for example, a corporate network that is wholly or partially inaccessible from computing systems external to the private network 165. Computing systems 145b may be, for example, home computing systems or mobile computing devices that each connects directly to the Internet (e.g., via a telephone line, cable modem, a Digital Subscriber Line ("DSL"), cellular network or other wireless connection, etc.).

The example data center 190 includes a number of physical computing systems 106a-106d and 155a-155n, as well as a Communication Manager module 150 that executes on one or more other computing systems or devices (not shown) to manage communications for the associated computing systems 155a-155n, and a System Manager module 110 that executes on one or more computing systems (not shown). In this example, each physical computing system 106a-106d hosts multiple virtual machine computing nodes and includes an associated virtual machine ("VM") communication manager module (e.g., as part of a virtual machine hypervisor monitor for the physical computing system), such as VM Communication Manager module 109a and multiple virtual machines 107a on host computing system 106a, and such as VM Communication Manager module 109d and multiple virtual machines 107d on host computing system 106d. Physical computing systems 155a-155n do not execute any virtual machines in this example, and thus may each act as a computing node that directly executes one or more software programs on behalf of a user. The Communication Manager module 150 that manages communications for the associated computing systems 155a-155n may be implemented as part of various types of devices, such as, for example, a proxy computing device, a firewall device, or a networking device (e.g., a switch, router, hub, etc.) through which communications to and from the physical computing systems travel. In other embodiments, all or none of the physical computing systems at the data center may host virtual machines.

This example data center 190 further includes multiple physical networking devices, such as switches 119a-119b, edge router devices 127a-127d, and core router devices 132a-132c. Switch 119a is part of a physical sub-network that includes physical computing systems 106a-106c, and is connected to edge router 127a. Switch 119b is part of a distinct physical sub-network that includes physical computing systems 106d and 155a-155n, as well as the computing systems providing the Communication Manager module 150 and the System Manager module 110, and is connected to edge router 127b. The physical sub-networks established by switches 119a-119b, in turn, are connected to each other and other networks (e.g., the internet 185) via an intermediate interconnection network 122, which includes the edge routers 127a-127d and the core routers 132a-132c. The edge routers 127a-127d provide gateways between two or more physical sub-networks or networks. For example, edge router 127a provides a gateway between the physical sub-network established by switch 119a and the interconnection network 122, while edge routers 127c and 127d provide one or more gateways between the interconnection network 122 and internet 185 (e.g., via the edge modules 108). The core routers 132a-132c manage communications within the interconnection network 122, such as by routing or otherwise forwarding packets or other data transmissions as appropriate based on characteristics of such data transmissions (e.g., header information including source and/or destination addresses, protocol identifiers, etc.) and/or the characteristics of the interconnection network 122 itself (e.g., routes based on the physical network topology, etc.). In addition, in this example, the data center 190 includes multiple alternative edge modules 108 that manage communications between computing nodes at the data center 190 and other external computer systems (e.g., computing systems 145a, computing systems 145b, computing systems at other data centers 160, etc.), via one or more inter-location network communication links 175. While not illustrated here, other devices may optionally be provided and used to provide various benefits, such as one or more load balancer devices to optionally assist in managing the multiple alternative edge devices 108, such as for communications sent from computing nodes at the data center 190 to a particular substrate network address associated with the load balancer(s).

The illustrated System Manager module and Communication Manager modules of FIG. 1B may perform at least some of the described techniques in order to configure, authorize and otherwise manage communications sent to and from associated computing nodes, including to support providing various virtual networking functionality for one or more virtual computer networks that are provided using various of the computing nodes, and/or to support providing various emulated functionality for one or more virtual networking devices that are configured for one or more such provided virtual computer networks. For example, Communication Manager module 109a manages associated virtual machine computing nodes 107a, Communication Manager module 109d manages associated virtual machine computing nodes 107d, and each of the other Communication Manager modules may similarly manage communications for a group of one or more other associated computing nodes. The illustrated Communication Manager modules may configure communications between computing nodes so as to overlay one or more particular virtual networks over one or more intermediate physical networks that are used as a substrate network, such as over the interconnection network 122. Furthermore, a particular virtual computer network may optionally be extended beyond the data center 190 in some embodiments, such as if one or more other data centers 160 also provide computing nodes that are available for use by the example CNS system, and the particular virtual network includes computing nodes at two or more such data centers at two or more distinct geographical locations. Multiple such data centers or other geographical locations of one or more computing nodes may be interconnected in various manners, including the following: directly via one or more public networks in a non-private manner, or via a private connection, not shown (e.g., a dedicated physical connection that is not shared with any third parties, such as a leased line; or a VPN or other mechanism that provides the private connection over a public network); etc. In addition, while not illustrated here, other such data centers or other geographical locations may each include one or more other Communication Manager modules that manage communications for computing systems at that data center or other geographical location, as well as over the global internet 135 to the data center 100 and any other such data centers 160.

In addition, a particular virtual computer network may optionally be extended beyond the data center 190 in other manners in other embodiments, such as if one or more other Communication Manager modules at the data center 100 are placed between edge routers 127c and 127d and the global internet 135 (e.g., if the edge modules 108 each provide at least some of the functionality of a Communication Manager module in encoding and decoding communications for virtual computer networks to use the underlying substrate network 122 and/or to support multi-part messages), or instead based on one or more other Communication Manager modules external to the data center 190 (e.g., if another Communication Manager module not shown, is made part of private network 165, so as to manage communications for computing systems 145a over the internet 185 and private network 165; etc.). Thus, for example, if an organization operating private network 165 desires to virtually extend its private computer network 165 to one or more of the computing nodes of the data center 190, it may do so by implementing one or more Communication Manager modules as part of the private network 165 (e.g., as part of the interface between the private network 165 and the internet 185)—in this manner, computing systems 145a within the private network 165 may communicate with those data center computing nodes as if those data center computing nodes were part of the private network. In other embodiments, the private computer network 165 may instead be extended to one or more computing nodes of the data center 190 by an edge module 108 of the data center 190 managing the communications between computing nodes of the private network 165 and particular data center 190 computing nodes.

Thus, as one illustrative example without using multi-part messages, one of the virtual machine computing nodes 107a on computing system 106a (in this example, virtual machine computing node 107a1) may be part of the same provided virtual computer network as one of the virtual machine computing nodes 107d on computing system 106d (in this example, virtual machine computing node 107d1), and may further optionally both be assigned to a specified logical subnet of that virtual computer network that includes a subset of the computing nodes for that virtual computer network, such as with the IPv4 networking protocol being used to represent the virtual network addresses for the virtual computer network. The virtual machine 107a1 may then direct an outgoing communication (not shown) to the destination virtual machine computing node 107d1, such as by specifying a virtual network address for that destination virtual machine computing node (e.g., a virtual network address that is unique for the local broadcast domain of the specified logical subnet). The Communication Manager module 109a receives the outgoing communication, and in at least some embodiments determines whether to authorize the sending of the outgoing communication, such as based on previously obtained information about the sending virtual machine computing node 107a1 and/or about the destination virtual machine computing node 107d1 (e.g., information about virtual computer networks and/or entities with which the computing nodes are associated, information about any specified logical subnets to which the computing nodes belong, etc.), and/or by dynamically interacting with the System Manager module 110 (e.g., to obtain an authorization determination, to obtain some or all such information, etc.). By not delivering unauthorized communications to computing nodes, network isolation and security of entities' virtual computer networks is enhanced.

Figure 2A:
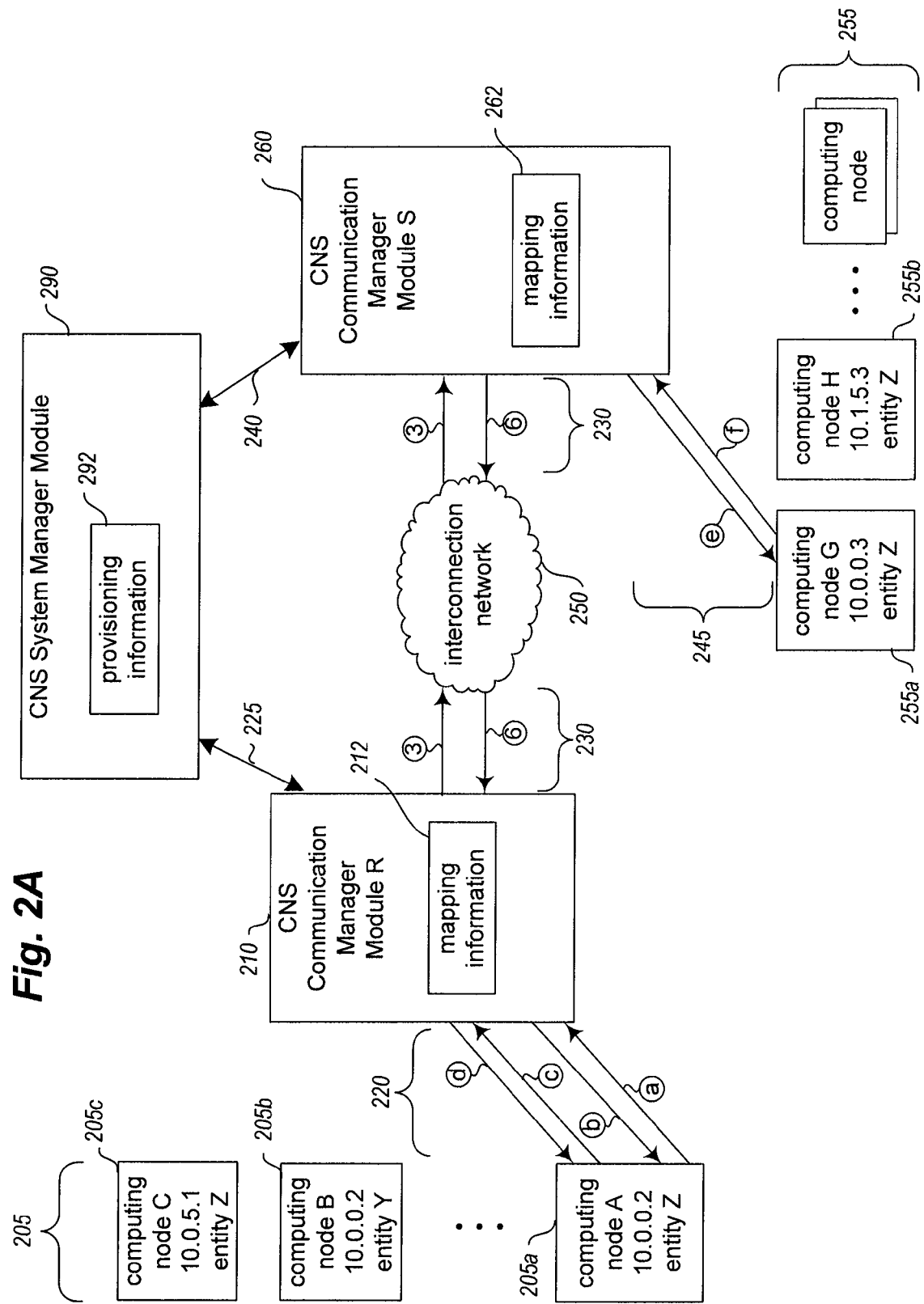
Figure 2B:
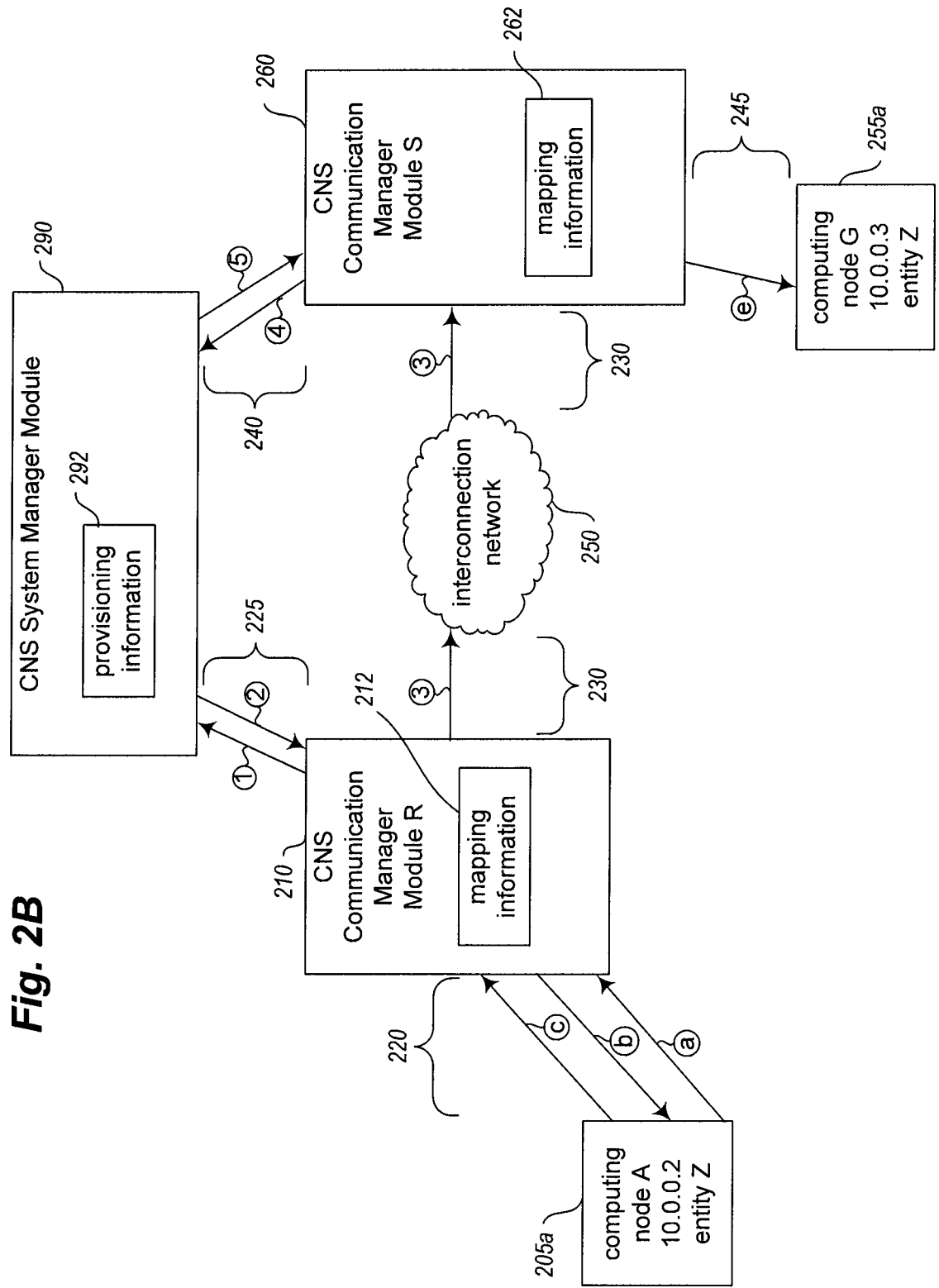

If the Communication Manager module 109a determines that the outgoing communication is authorized (or does not perform such an authorization determination), the module 109a determines the actual physical network location corresponding to the destination virtual network address for the communication. For example, the Communication Manager module 109a may determine the actual destination network address to use for the virtual network address of the destination virtual machine 107d1 by dynamically interacting with the System Manager module 110, or may have previously determined and stored that information (e.g., in response to a request from the sending virtual machine 107a1 for information about that destination virtual network address, such as a request that the virtual machine 107a1 specifies using Address Resolution Protocol, or ARP). The Communication Manager module 109a then re-headers or otherwise modifies the outgoing communication so that it is directed to Communication Manager module 109d using an actual substrate network address, such as if Communication Manager module 109d is associated with a range of multiple such actual substrate network addresses. FIGS. 2A-2B provide examples of doing such communication management in some embodiments.

When Communication Manager module 109d receives the communication via the interconnection network 122 in this example, it obtains the virtual destination network address for the communication (e.g., by extracting the virtual destination network address from the communication), and determines to which of the virtual machine computing nodes 107d managed by the Communication Manager module 109d that the communication is directed. The Communication Manager module 109d next determines whether the communication is authorized for the destination virtual machine computing node 107d1, with examples of such authorization activities discussed in further detail in the examples of FIGS. 2A-2B. If the communication is determined to be authorized (or the Communication Manager module 109d does not perform such an authorization determination), the Communication Manager module 109*d* then re-headers or otherwise modifies the incoming communication so that it is directed to the destination virtual machine computing node 107*d*1 using an appropriate virtual network address for the virtual computer network, such as by using the sending virtual machine computing node 107*a*1's virtual network address as the source network address and by using the destination virtual machine computing node 107*d*1's virtual network address as the destination network address. The Communication Manager module 109*d* then forwards or otherwise provides the modified communication to the destination virtual machine computing node 107*d*1, such as via shared memory (not shown) of the computing system 106*d*. In at least some embodiments, before forwarding the incoming communication to the destination virtual machine, the Communication Manager module 109*d* may also perform additional steps related to security, as discussed in greater detail elsewhere.

In addition, while not illustrated in FIG. 1B, in some embodiments the various Communication Manager modules may take further actions to provide virtual networking functionality corresponding to a specified network topology for the provided virtual computer network (e.g., for one or more virtual networking devices for the provided virtual computer network), such as by managing communications between computing nodes of the provided virtual computer network in specified manners and by responding to other types of requests sent by computing nodes of the virtual computer network. For example, although being separated from computing node 107*a*1 on physical computing system 106*a* by the interconnection network 122 in the example embodiment of FIG. 1B, virtual machine computing node 107*d*1 on physical computing system 106*d* may be configured to be part of the same logical sub-network of the virtual computer network as computing node 107*a*1 (e.g., to not be separated by any specified router devices). Conversely, despite the physical proximity of virtual machine computing node 107*c*1 on physical computing system 106*c* to virtual machine computing node 107*a*1 on physical computing system 106*a* (i.e., being part of the same physical sub-network without any intervening physical substrate router devices) in the example embodiment of FIG. 1B, computing node 107*c*1 may be configured to be part of a distinct logical sub-network of the virtual computer network from that of computing node 107*a*1 (e.g., may be configured to be separated by one or more specified router devices, not shown, which in this example are virtual router devices that are not physically provided for the virtual computer network). If computing nodes 107*a*1 and 107*d*1 are configured to be part of the same logical sub-network, the previous example of sending a communication from computing node 107*a*1 to computing node 107*d*1 may be performed in the manner previously described, without emulating the actions of any intervening virtual router devices (despite the use of multiple physical router devices in the substrate interconnection network 122 for forwarding the communication), since computing nodes 107*a*1 and 107*d*1 are configured to be part of single sub-network in the specified network topology.

However, if computing node 107*a*1 sends an additional communication to computing node 107*c*1, the Communication Manager modules 109*a* and/or 109*c* on the host computing systems 106*a* and 106*c* may perform additional actions that correspond to one or more virtual specified router devices configured in the specified network topology to separate the computing nodes 107*a*1 and 107*c*1. For example, the source computing node 107*a*1 may send the additional communication in such a manner as to initially direct it to a first of the virtual specified router devices that is configured to be local to computing node 107*a*1 (e.g., by including a virtual hardware address in the header of the additional communication that corresponds to that first virtual specified router device), with that first virtual specified router device being expected to forward the additional communication on toward the destination computing node 107*c*1 via the specified logical network topology. If so, the source Communication Manager module 109*a* may detect that forwarding of the additional communication to the virtual first router device (e.g., based on the virtual hardware address used in the header of the additional communication), or otherwise be aware of the configured network topology for the virtual computer network, and may take actions to emulate functionality of some or all of the virtual specified router devices that are configured in the specified network topology to separate the computing nodes 107*a*1 and 107*c*1. For example, each virtual router device that forwards the additional communication may be expected to take actions such as modifying a TTL ("time to live") hop value for the communication, modify a virtual destination hardware address that is specified for the communication to indicate the next intended destination of the additional communication on a route to the destination computing node, and/or otherwise modify the communication header. If so, the source Communication Manager module 109*a* may perform some or all of those actions before forwarding the additional communication directly to the destination Communication Manager module 109*c* over the substrate network (in this case, via physical switch device 119*a*) for provision to destination computing node 107*c*1. Alternatively, some or all such additional actions to provide the virtual networking functionality for the sent additional communication may instead be performed by the destination Communication Manager module 109*c* after the additional communication is forwarded to the Communication Manager module 109*c* by the Communication Manager module 109*a*.

Furthermore, as part of the prior continuing example, computing node 107*d*1 may determine to send a third communication to a final destination computer system external to the data center, such as to a particular computing system 145*a* (e.g., with the particular computing system 145*a* not being part of the virtual computer network to which computing node 107*d*1 belongs). In this situation, the Communication Manager module 109*d* on the host computing system 106*d* that is associated with the source computing node 107*d*1 may further perform additional actions to support the use of an intermediate destination for the communication, such as one of the various edge modules 108. Thus, the Communication Manager module 109*d* may determine that the final destination computing system 145*a* is external to the data center 190, and encode the outgoing communication from the source computing node 107*d*1 for forwarding over the substrate network 122 from the host computing system 106*d* to one of the edge modules 108 (e.g., by using a substrate network address associated with one or more of the edge modules 108 as the initial destination network address for the encoded communication, and using a substrate network address associated with the host computing system 106*d* as a source network address for the encoded communication). The intermediate destination edge module 108 may then handle the encoded communication in a typical manner, such as by optionally decoding the communication, and forwarding the communication over the internet 185 to the final destination computing system 145*a*.

Moreover, as an extension to the prior continuing example, the Communication Manager module 109*d* on the host computing system 106*d* may further determine to encode the outgoing third communication from computing node 107*d*1 into a multi-part message to be forwarded to the final destination computer system 145a external to the data center, such as based on the availability of alternative network paths between the computing node 107d1 and the final destination computer system 145a1. If so, the Communication Manager module 109d determines one or more alternative network paths to use for the multi-part message, optionally by dynamically interacting with the System Manager module 110 to obtain current information about such alternative network paths and/or by otherwise retrieving previously received information. The Communication Manager module 109d then encodes the third communication into multiple parts, as discussed elsewhere, and distinctly sends each of the multiple parts to the intermediate destination edge module 108 (or optionally to multiple edge modules 108 if they are operating cooperatively). In this example, the edge module(s) 108 receive some or all of the multiple parts of the multi-part message, and act as a destination communication manager module associated with the final destination computer system 145a. In particular, the edge module(s) 108 decode the received parts back into the original third communication, which is then forwarded over the internet 185 to the final destination computer system 145a.

In this example, various types of alternative network communication links may be available within the data center 190 for use in multiple alternative network paths, and if so they may each be used as part of one or more distinct alternative network paths between at least some pairs of locations. For example, in the illustrated embodiment of FIG. 1B, multiple alternative communication links 102 may optionally be used to connect computing system 106d to switch 119b, such as if each of the communication links 102 corresponds to a distinct network interface (not shown) of the computing system 106d that has one or more distinct substrate network addresses. If so, each of the virtual machine computing nodes 107d may have multiple alternative network paths with which to send communications to and/or receive communications from other computing nodes or systems external to computing system 106d, such as with each of the communication links 102 being part of one or more distinct alternative network paths. In addition, multiple alternative communication links may optionally exist between other devices or modules in the substrate network, such as multiple communication links 104a between edge router 127c and edge module 108a in the example of FIG. 1B—in this situation, a particular communication link 145a may optionally be selectable by Communication Manager module 109d (e.g., if the edge module 108a includes multiple distinct interfaces that each corresponds to one of the communication links 145a) in some situations, while in other situations the edge router 127c and/or edge module 108a may determine which communication link 145a to use for any particular communication that they receive. Thus, in this example, a non-exclusive list of possible alternative network paths that the communication manager module 109d may be able to determine to use for a multi-part message for the sent communication include the following: a first alternative network path that includes a first of the communication links 102, a second alternative network path that includes a second of the communication links 102, a third alternative network path that includes a third of the communication links 102, etc. Furthermore, if at least some of the multiple parts of the multi-part message are directed to edge module 108a in this example, an expanded non-exclusive list of possible alternative network paths that the communication manager module 109d may be able to determine to use for a multi-part message for the sent communication include the following: a first alternative network path that includes a first of the communication links 102 and a first of the communication links 104a; another alternative network path that includes the first communication link 102 and a second of the communication links 104a; another alternative network path that includes a second of the communication links 102 and the first communication link 104a; etc.

Furthermore, if another fourth outgoing communication from virtual machine computing node 107d1 is sent to a computing node external to the data center 190 that is part of the same virtual computer network, such as to a computing node at a data center 160 that has an associated communication manager module at the data center 160, the multiple parts of the multi-part message for the fourth outgoing communication may be distinctly sent over the internet 185 to that data center 160, with that associated destination communication manager module at the data center 160 performing the decoding of the multi-part message back into the original fourth communication. In this situation, the alternative network paths that are available to the sending Communication Manager module 109d may still be based on the various possible alternative paths within the data center 190 that were previously discussed, but may further include additional alternatives. For example, if multiple inter-location network communication links 175 are available, they may each be used as part of one or more distinct alternative network paths between computing nodes at the data center 190 and computer systems at other locations. The inter-location network communication links 175 may each optionally be associated with one or more of the edge modules 108, and the network communication links 175 may optionally include multiple distinct communication links that operate independently of each other (e.g., being provided by different service providers, being of different types, etc.). As one specific example, the network communication links 175 may include a first network communication link (not shown) that is accessible only by edge module 108a, and a second network communication link (not shown) that is accessible only by edge module 108b—if so, a network path using the second network communication link may be accessed by a communication manager module 109 or 150 by sending a communication over the interconnection network 122 to edge module 108b (e.g., by using a substrate network address for edge module 108b to forward that communication over the interconnection network 122). Alternatively, the network communication links 175 may optionally include a group of multiple communication links that are each accessible by any of the edge modules 108. If so, any of the communication links 175 may be accessed by one of the communication manager modules 109 or 150 by sending a communication over the interconnection network 122 to any of the edge modules 108 (e.g., by using a substrate network address corresponding to a particular selected edge module 108 to forward that communication over the interconnection network 122 to that edge module; by using a substrate network address that is common to all of the edge modules 108, such as a substrate network address that is assigned to a load balancer (not shown) for the edge modules 108 or that is an anycast address corresponding to the group of edge modules 108; etc.).

Thus, as one specific example, if computing node 107d1 on computing system 106d is sending the outgoing fourth communication to the final destination computing node at one of the data centers 160, a non-exclusive list of possible alternative network paths that the communication manager module 109d may be able to determine to use for a multi-part message for that sent communication include the following: a first alternative network path that includes a first of the communication links 102, a first of the communication links 104a, and a first of the communication links 175; another alternative network path that includes the first communication link 102, the first communication link 104a, and a second of the communication links 175; another alternative network path that includes the first communication link 102, a second of the communication links 104a, and the first communication link 175 another alternative network path that includes a second of the communication links 102, the first communication link 104a, and the first communication link 175; another alternative network path that includes the first communication link 102, the communication link 104b, and the first communication link 175; etc. In addition, the network internal to the data center 160 may further include alternative communication links that may further be used for alternative network paths, in a manner similar to that described with respect to data center 190, but such additional alternative communication links are not illustrated in this example.

In addition, it will be appreciated that different locations may have different alternative network paths that connect to those locations. For example, while the alternative network paths between the location of computing node 107d1 and a location external to the data center 190 may be based on the use of alternative communication links 102, 104a and/or 175, the alternative network paths between the location of computing node 107a1 and the same external location will not be based on the use of alternative communication links 102. Similarly, the alternative network paths between the location of computing node 107a1 and the location of computing node 107d1 may be based on the use of alternative communication links 102, they may not be based on the use of alternative communication links 104a or 175. In addition, no alternative network paths may be available between some location pairs, such as between the locations of the computing nodes 107a and 107c in this example. While particular example alternative communication links and alternative network paths have been discussed with respect to FIG. 1B for illustrative purposes, it will be appreciated that some or all of these types of alternative communication links may not be used in some embodiments, and/or that additional types of alternative communication links may be used in some embodiments.

By providing virtual networking functionality using the described techniques, the CNS system provides various benefits. For example, because the various Communication Manager modules manage the overlay virtual network, specified networking devices and other network topology do not need to be physically implemented for virtual computer networks being provided, and thus corresponding modifications are not needed to the interconnection network 122 or switches 119a-119b to support particular configured network topologies. Nonetheless, if the computing nodes and software programs of a virtual computer network have been configured to expect a particular network topology for the provided virtual computer network, the appearance and functionality of that network topology may nonetheless be transparently provided for those computing nodes by the described techniques. In addition, the use of the described techniques by the CNS system enables alternative intermediate destinations and alternative communication links to be used with communications in various manners as desired, including to encode communications into multi-part messages that use multiple alternative network paths, such as in a first manner specific to a first managed computer network that is distinct from a second manner specific to a second managed computer network (e.g., based on configuration information specified for the first and/or second managed computer networks by the clients for whom they are provided, based on automated decisions by the CNS system without knowledge of those clients and/or the ability of the computing nodes of those managed computer networks to detect the use of the multi-part messages, etc.), and including to support changes in alternative network paths are used to accommodate changing conditions.

Thus, various aspects of providing managed computer networks are described above, as well as elsewhere in this document, including to support virtual computer networks that are overlaid on an underlying substrate network. In addition, in at least some embodiments, the CNS system may use multiple communication manager modules in additional manners, such as to emulate responses to networking requests made by computing nodes in the manner of a local physical networking device, including to respond to ping requests, SNMP ("Simple Network Management Protocol") queries, etc. Furthermore, as described in greater detail below, in at least some embodiments, multiple modules of the CNS system may operate together in a distributed manner to provide a particular type of functionality (e.g., functionality corresponding to a load balancer that manages a pool of devices, functionality corresponding to a particular logical networking device, etc.), such that no single module or physical device is singly responsible for emulating that particular type of functionality.

Figure 2D:
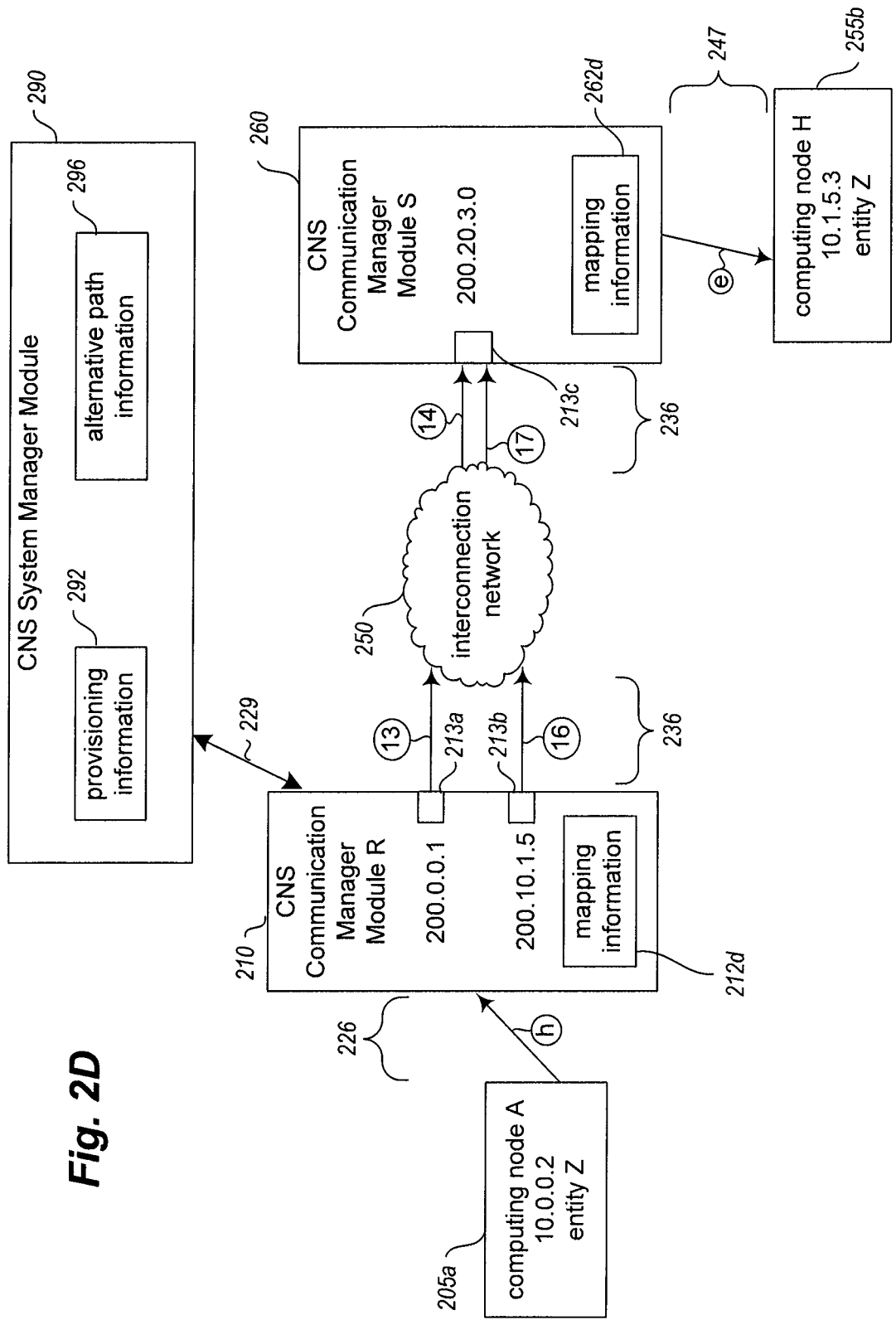

FIGS. 2A-2D illustrate further examples with additional illustrative details related to managing communications between computing nodes that occur via an overlay network over one or more physical networks, such as may be used by the computing nodes and networks of FIGS. 1A and/or 1B, or in other situations. In these examples, FIGS. 2A and 2B illustrate details regarding actions of various modules of an example CNS system in managing communications for computing nodes of a managed computer network that are sent directly to their final destinations without using multi-part messages, while FIGS. 2C and 2D illustrate additional details regarding similar actions in managing communications that are sent to final destinations via encoded multi-part messages that use multiple alternative network paths.

In particular, FIG. 2A illustrates various example computing nodes 205 and 255 that may communicate with each other by using one or more intermediate interconnection networks 250 as a substrate network. In this example, IPv4 virtual computer networks are overlaid on an underlying substrate interconnection network 250, with the substrate network being, for example, a distinct IPv4 network or an IPv6 substrate network, although in other embodiments the interconnection network 250 and overlay virtual computer networks may use other networking protocols. In addition, in this example embodiment, the computing nodes are operated on behalf of multiple distinct entities to whom managed computer networks are provided, and a System Manager module 290 manages the association of particular computing nodes with particular entities and managed virtual computer networks, and tracks various configuration information specified for the managed virtual computer networks. The example computing nodes of FIG. 2A include four computing nodes executed on behalf of an example entity Z and part of a corresponding first managed virtual computer network provided for client entity Z, those being computing nodes 205a, 205c, 255a and 255b. In addition, other computing nodes are operated on behalf of other entities and belong to other provided virtual computer networks, such as computing node 205b that is part of a second managed virtual computer network provided for client entity Y, as well as other computing nodes 255.

In this example, the computing nodes 205 are managed by and physically connected to an associated Communication Manager module R 210, and the computing nodes 255 are managed by and physically connected to an associated Communication Manager module S 260. The CNS Communication Manager modules 210 and 260 are physically connected to an interconnection network 250, as is the System Manager module 290, although the physical interconnections between computing nodes, modules and the interconnection network are not illustrated in this example. As one example, computing nodes 205 may each be one of multiple virtual machines hosted by a single physical computing system, and Communication Manager module R may be part of a hypervisor virtual machine monitor for that physical computing system—if so, communications between the computing nodes 205 and the Communication Manager module R may be passed within that physical computing system without using any intervening computer network, such as via memory of the physical computing system, an internal bus of the physical computing system, etc. For example, with reference to FIG. 1B, computing nodes 205 may represent the virtual machines 107a, and computing nodes 255 may represent the virtual machines 107d. If so, Communication Manager module R would correspond to Communication Manager module 109a of FIG. 1B, Communication Manager module S would correspond to Communication Manager module 109d of FIG. 1B, the interconnection network 250 would correspond to interconnection network 122 of FIG. 1B, and the System Manager module 290 would correspond to System Manager module 110 of FIG. 1B. Alternatively, computing nodes 205 or 255 may instead each be a distinct physical computing system, such as to correspond to computing systems 155a-155n of FIG. 1, or to computing nodes at other data centers or geographical locations (e.g., computing systems at another data center 160, computing systems 145a, etc.).

In this example, each of the Communication Manager modules of FIG. 2A is associated with a group of multiple physical substrate network addresses, which the Communication Manager modules manage on behalf of their associated computing nodes, although in other embodiments each Communication Manager module may instead use a single substrate network address that it shares among two or more associated computing nodes. For example, if the interconnection network 250 is an IPv4 network, Communication Manager module R may be associated with the IPv4 CIDR block 200.0.0.1/28, so as to enable at least some of the IPv4 addresses from 200.0.0.1 to 200.0.0.16 to each be treated as a substrate network address associated with one of the computing nodes, and Communication Manager module S may similarly be associated with the IPv4 CIDR block 200.20.3.0/24. Alternatively, if the interconnection network 250 is an IPv6 network, Communication Manager module R may, for example, be associated with the IPv6 network address range of "::0A:01/72", which corresponds to the 128-bit addresses (in hexadecimal) from XXXX:XXXX:XXXX:XXXA:0100: 0000:0000:0000 to XXXX:XXXX:XXXX:XXXA: 01FF: FFFF:FFFF:FFFF (representing 2 to the power of 56 unique IPv6 addresses), where each "X" may represent any hexadecimal character that is appropriate for a particular situation—if so, the interconnection network 250 will forward any communication with a destination network address in that range to Communication Manager module R, and with the initial 72 bits of the range specified, the Communication Manager module R may use the remaining available 56 bits to represent the computing nodes that it manages and to determine how to process incoming communications whose destination network addresses are in that range. If the interconnection network 250 is an IPv6 network, the Communication Manager module S may similarly be associated with an IPv6 network address range such as "::0B:02/72".

For purposes of the example shown in FIG. 2A, computing nodes 205a, 205c, 255a, and 255b are part of a single managed virtual computer network provided for entity Z, and have assigned IPv4 virtual network addresses of "10.0.0.2", "10.0.5.1", "10.0.0.3", and "10.1.5.3", respectively. Because computing node 205b is part of a distinct managed virtual computer network that is provided for entity Y, it can share the same virtual network address as computing node 205a without confusion. In this example, computing node A 205a intends to communicate with computing node G 255a, with the two computing nodes configured in this example to be part of a single common physical local area sub-network (not shown) in a configured network topology for the managed virtual computer network, and the interconnection network 250 and Communication Manager modules are transparent to computing nodes A and G in this example.

In particular, despite the physical separation of computing nodes A and G, the Communication Manager modules 210 and 260 operate so as to overlay the managed virtual computer network for entity Z over the physical interconnection network 250 for communications between those computing nodes, including to emulate functionality corresponding to the configured local area sub-network of the managed virtual computer network, so that the lack of an actual local area network is transparent to the computing nodes A and G.

In order to send the communication to computing node G, computing node A exchanges various messages 220 with Communication Manager module R 210, despite in the illustrated embodiment being unaware of the existence of Communication Manager module R (i.e., computing node A may believe that it is transmitting a broadcast message to all other nodes on the local sub-network, such as via a specified switching device that computing node A believes connects the nodes on the local sub-network). In particular, in this example, computing node A first sends an ARP message request 220-a that includes the virtual network address for computing node G (i.e., "10.0.0.3") and that requests the corresponding hardware address for computing node G (e.g., a 48-bit MAC address). Communication Manager module R intercepts the ARP request 220-a, and responds to computing node A with a spoofed ARP response message 220-b that includes a virtual hardware address for computing node G.

To obtain the virtual hardware address for computing node G to use with the response message, the Communication Manager module R first checks a local store 212 of information that maps virtual hardware addresses to corresponding actual physical substrate network addresses, with each of the virtual hardware addresses also corresponding to an IPv4 virtual network address for a particular entity's managed virtual computer network. If the local store 212 does not contain an entry for computing node G (e.g., if none of the computing nodes 205 have previously communicated with computing node G and the System Manager module 290 does not push mapping information to the Communication Manager Module R without request; if a prior entry in local store 212 for computing node G has expired based on an associated expiration time; etc.), the Communication Manager module R interacts 225 with System Manager module 290 to obtain the corresponding actual physical substrate network address for computing node G on behalf of computing node A. In particular, in this example, the System Manager module 290 maintains provisioning information 292 that identifies where each computing node is actually located and to which entity and/or managed virtual computer network the computing node belongs, such as by initiating execution of programs on computing nodes for entities and virtual computer networks or by otherwise obtaining such provisioning information. As discussed in greater detail with respect to FIG. 2B, the System Manager module may determine whether the request from Communication Manager module R on behalf of computing node A for computing node G's actual physical substrate network address is valid, including whether computing node A is authorized to communicate with computing node G (e.g., such as based on being part of the same configured local area sub-network), and if so provides that actual physical substrate network address.

Communication Manager module R receives the actual physical substrate network address for computing node G from the System Manager module 290, and stores this received information as part of an entry for computing node G as part of mapping information 212 for later use (optionally with an expiration time and/or other information). In addition, in this example, Communication Manager module R determines a virtual hardware address to be used for computing node G (e.g., by generating a dummy identifier that is locally unique for the computing nodes managed by Communication Manager module R), stores that virtual hardware address in conjunction with the received actual physical substrate network address as part of the mapping information entry, and provides the virtual hardware address to computing node A as part of response message 220-b. By maintaining such mapping information 212, later communications from computing node A to computing node G may be authorized by Communication Manager module R without further interactions with the System Manager module 290, based on the use of the virtual hardware address previously provided by Communication Manager module R. In some embodiments, the hardware address used by Communication Manager module R for computing node G may not be a dummy address, such as if System Manager module 290 further maintains information about hardware addresses used by the various computing nodes (e.g., virtual hardware addresses assigned to virtual machine computing nodes, actual hardware addresses assigned to computing systems acting as computing nodes, etc.) and provides the hardware address used by computing node G to Communication Manager module R as part of the interactions 225. In such embodiments, the Communication Manager module R may take further actions if computing nodes on different virtual networks use the same virtual hardware address, such as to map each combination of computing node hardware address and managed virtual computer network to a corresponding substrate network address.

In other embodiments, Communication Manager module R may interact with System Manager module 290 to obtain a physical substrate network address for computing node G or otherwise determine such a physical substrate network address at times other than upon receiving an ARP request, such as in response to any received communication that is directed to computing node G using the virtual network address "10.0.0.3" as part of entity Z's virtual computer network, or if the System Manager module provides that information to Communication Manager module R without request (e.g., periodically, upon changes in the information, etc.). Furthermore, in other embodiments, the virtual hardware addresses that are used may differ from this example, such as if the virtual hardware addresses are specified by the System Manager module 290, if the virtual hardware addresses are not random and instead store one or more types of information specific to the corresponding computing nodes, etc. In addition, in this example, if computing node A had not been determined to be authorized to send communications to computing node G, whether by the System Manager module 290 and/or Communication Manager module R, Communication Manager module R would not send the response message 220-b with the virtual hardware address (e.g., instead sends no response or an error message response).

In this example, if the interconnection network 250 is an IPv4 network, the returned actual physical substrate network address corresponding to computing node G in interactions 225 may be, for example, 200.20.3.13, such as if the System Manager module 290 and/or the Communication Manager module S 260 has selected that substrate network address to represent computing node G from the substrate network address range associated with Communication Manager module S 260—thus, a communication sent over the interconnection network 250 to 200.20.3.13 will be routed to Communication Manager module S for handling. Alternatively, if the interconnection network 250 is an IP64 network, the returned IPv6 actual physical substrate network address corresponding to computing node G in interactions 225 may be "::06:02:<Z-identifier>:10.0.0.3", where "10.0.0.3" is stored in the last 32 bits of the 128-bit IPv6 address, and where "<Z-identifier>" is a 24-bit entity network identifier for computing node G corresponding to the managed virtual computer network for entity Z (e.g., as previously assigned by the System Manager module to that network to reflect a random number or some other number corresponding to the entity). In this example, the initial 72 bits of the IPv6 network address store the "::0B:02" designation, corresponding to the sub-network or other portion of the physical interconnection network with a network address range of "::0B:02/72" to which Communication Manager module S corresponds—thus, a communication sent over the interconnection network 250 to IPv6 destination network address "::06:02:<Z-identifier>:10.0.0.3" will similarly be routed to Communication Manager module S for handling. In other embodiments, the entity network identifier may be other lengths (e.g., 32 bits, if Communication Manager module S has an associated network address range of 64 bits rather than 56 bits) and/or may have other forms (e.g., may be random, may store various types of information, etc.), and the remaining 56 bits used for the network address range after the "::0B:02" designation may store other types of information (e.g., an identifier for a particular entity, a tag or label for the virtual computer network, an identifier for a particular specified VLAN to which computing node G is assigned, etc.). In addition, some or all such information may instead be stored and/or transmitted with a communication to computing node G in other manners in other embodiments, such as by including the information in a header of the communication, including in situations in which the substrate network uses the IPv4 networking protocol.

After receiving the response message 220-b from Communication Manager module R, computing node A creates and initiates the sending of a communication to computing node G, shown in FIG. 2A as communication 220-c. In particular, the header of communication 220-c includes a destination network address for destination computing node G that is "10.0.0.3", a destination hardware address for destination computing node G that is the virtual hardware address provided to computing node A in message 220-b, a source network address for sending computing node A that is "10.0.0.2", and a source hardware address for sending computing node A that is an actual or dummy hardware address that was previously identified to computing node A (e.g., by Communication Manager module R, based on a configuration of computing node A, etc.). Since computing node A believes that computing node G is part of the same local sub-network as itself, computing node A does not need to direct the communication 220-c to any intermediate logical router devices that are configured in a network topology for the managed virtual computer network to separate the computing nodes.

Communication Manager module R intercepts the communication 220-c, modifies the communication as appropriate, and forwards the modified communication over the interconnection network 250 to computing node G. In particular, Communication Manager module R extracts the virtual destination network address and virtual destination hardware address for computing node G from the header, and then retrieves the actual physical substrate network address corresponding to that virtual destination hardware address from mapping information 212. As previously noted, the actual physical substrate network address may be, for example, "200.20.3.13" or "::06:02:<Z-identifier>10.0.0.3", and Communication Manager module R creates a new IPv4 or IPv6 header for the encoded new communication (depending on whether the interconnection network is an IPv4 or IPv6 network, respectively) that includes that actual physical substrate network address as the destination address. Similarly, the Communication Manager module R extracts the virtual source network address and virtual source hardware address for computing node A from the header of the received communication, obtains an actual physical substrate network address corresponding to that virtual source hardware address (e.g., from a stored entry in mapping information 212, by interacting with the System Manager module 290 to obtain that information if not previously obtained, etc.), and includes that actual physical substrate network address as the source network address for the new header of the new encoded communication. In this example, the actual physical substrate network address for computing node A may be "200.0.0.3" (if the interconnection network is an IPv4 network) or "::0A:01:<Z-identifier>:10.0.0.2" (if the interconnection network is an IPv6 network), which if used in a reply by Communication Manager module S on behalf of computing node G will be routed to Communication Manager module R for forwarding to computing node A. The Communication Manager module R then creates communication 230-3 by modifying communication 220-c so as to replace the prior IPv4 header with the new header (e.g., in accordance with SIIT), including populating the new header with other information as appropriate for the encoded modified communication (e.g., payload length, traffic class packet priority, etc.). Thus, the communication 230-3 includes the same content or payload as communication 220-c, without encapsulating the communication 220-c within the communication 230-3 in this example. Furthermore, access to the specific information within the payload is not needed for such re-headering, such as to allow Communication Manager module R to handle communications in which the payload is encrypted without needing to decrypt that payload.

In at least some embodiments, before forwarding communication 230-3 to Communication Manager module S, Communication Manager module R may perform one or more actions to determine that communication 220-c is authorized to be forwarded to computing node G as communication 230-3, such as based on the mapping information 212 including a valid entry for the destination virtual hardware address used in communication 220-c (e.g., an entry specific to sending computing node 205a in some embodiments, or instead an entry corresponding to any of the computing nodes 205 in other embodiments). In other embodiments, such an authorization determination may not be performed by Communication Manager module R for each outgoing communication, or instead may be performed in other manners (e.g., based on a determination that the sending node and destination node are part of the same managed virtual computer network, are associated with the same entity, or are otherwise authorized to inter-communicate; based on an interaction with System Manager module 290 to obtain an authorization determination for the communication; etc.).

After Communication Manager module R forwards the modified communication 230-3 to the interconnection network 250, the interconnection network uses the physical destination substrate network address of the encoded communication to route the communication to Communication Manager module S. In doing so, the devices of the interconnection network 250 do not use information about the overlay virtual network addresses for computing nodes A or G or the entity network identifier for their virtual computer network, and thus do not need any special configuration to forward such a communication, nor even awareness that a managed virtual computer network is being overlaid on the physical interconnection network.

When Communication Manager module S receives communication 230-3 via the interconnection network 250, it performs actions similar to those of Communication Manager module R, but in reverse. In particular, in at least some embodiments, the Communication Manager module S verifies that communication 230-3 is legitimate and authorized to be forwarded to computing node G, such as via one or more interactions 240 with the System Manager module. If the communication is determined to be authorized (or if the authorization determination is not performed), the Communication Manager module S then modifies communication 230-3 as appropriate and forwards the modified communication to computing node G. Additional details related to the verification of the communication 230-3 are discussed with respect to FIG. 2B.

In particular, to modify communication 230-3, Communication Manager module S retrieves information from mapping information 262 that corresponds to computing node G, including the virtual hardware address used by computing node G (or generates such a virtual hardware address if not previously available, such as for a new computing node). Communication Manager module S then creates communication 245-e by modifying communication 230-3 so as to replace the prior header of the communication 230-3 encoded for the substrate network with a new IPv4 header for the overlay virtual computer network (e.g., in accordance with SIIT). The new IPv4 header includes the virtual network address and virtual hardware address for computing node G as the destination network address and destination hardware address for the new IPv4 header, the virtual network address and a virtual hardware address for computing node A as the source network address and source hardware address for the new IPv4 header, and includes other information as appropriate for the communication (e.g., total length, header checksum, etc.). The virtual hardware address used by Communication Manager module S for computing node A may be the same as the hardware address used by Communication Manager module R for computing node A, but in other embodiments each Communication Manager module may maintain separate hardware address information that is not related to the information used by the other Communication Manager modules (e.g., if Communication Manager module S generated its own dummy virtual hardware address for computing node A in response to a prior ARP request from one of the computing nodes 255 for computing node A's hardware address). Thus, the communication 245-e includes the same content or payload as communications 220-c and 230-3. Communication Manager module S then provides communication 245-e to computing node G.

After receiving communication 245-*e*, computing node G determines to send a response communication 245-*f* to computing node A, using the source virtual network address and source virtual hardware address for computing node A from communication 245-*e*. Communication Manager module S receives response communication 245-*f*, and processes it in a manner similar to that previously described with respect to communication 220-*c* and Communication Manager module R. In particular, Communication Manager module S optionally verifies that computing node G is authorized to send communications to computing node A (e.g., based on being a response to a previous communication, or otherwise based on configuration information for computing nodes A and G as previously described), and then modifies communication 245-*f* to create communication 230-6 by generating a new substrate network communication header using mapping information 262. After forwarding communication 230-6 to the interconnection network 250, the communication is sent to Communication Manager module R, which processes the incoming communication in a manner similar to that previously described with respect to communication 230-3 and Communication Manager module S. In particular, Communication Manager module R optionally verifies that computing node G is authorized to send communications to computing node A and that communication 230-6 actually was sent from the substrate network location of computing node G, and then modifies communication 230-6 to create response communication 220-*d* by generating a new IPv4 header for the overlay virtual computer network using mapping information 212. Communication Manager module R then forwards response communication 220-*d* to computing node A. In some embodiments and situations, Communication Manager modules R and/or S may handle response communications differently from initial communications, such as to assume that response communications are authorized in at least some situations, and to not perform some or all authorization activities for response communications in those situations.

In this manner, computing nodes A and G may inter-communicate using a IPv4-based managed virtual computer network, without any special configuration of those computing nodes to handle the actual intervening one or more substrate networks, and substrate interconnection network 250 may forward communications encoded for it without any special configuration of any physical networking devices of the substrate interconnection network, based on the Communication Manager modules overlaying the virtual computer network over the actual physical interconnection network.

In addition, while not illustrated with respect to FIG. 2A, in at least some embodiments the Communication Manager modules may receive and handle other types of requests and communications on behalf of associated computing nodes. For example, Communication Manager modules may take various actions to support broadcast and multicast capabilities for computing nodes that they manage, including to optionally use various special reserved multicast group virtual network addresses. When a computing node sends a broadcast/multicast communication, any Communication Manager module with an associated computing node that has subscribed to that multicast/broadcast group would be identified (e.g., based on those Communication Manager modules having subscribed to the group, such as in response to prior join communications sent by those associated computing nodes), and the Communication Manager module for the sending computing node would forward the communication to each of the identified Communication Manager modules of the group, for forwarding to their appropriate managed computing nodes. In addition, in some embodiments and situations, at least some broadcast or multicast communications may not be forwarded by Communication Manager modules, such as communications with an IPv4 prefix of 224.0/16 or another designated prefix or other label or identifier. In addition to supporting broadcast and multicast capabilities for managed computing nodes, the Communication Manager modules may receive and handle other types of requests and communications on behalf of associated computing nodes that correspond to configured network topologies for the virtual computer networks to which the computing nodes belong. For example, computing nodes may send various requests that a specified local router device or other specified networking device would be expected to handle (e.g., ping requests, SNMP queries, etc.), and the associated Communication Manager modules may intercept such requests and take various corresponding actions to emulate the functionality that would have been provided by the specified networking device if it was physically implemented.

In addition, it will be appreciated that a Communication Manager module may facilitate communications between multiple of the computing nodes that are associated with that Communication Manager module. For example, with respect to FIG. 2A, computing node 205*a* may wish to send an additional communication (not shown) to computing node 205*c*. If so, Communication Manager module R would perform actions similar to those previously described with respect to the handling of outgoing communication 220-*c* by Communication Manager module R and the handling of incoming communication 230-3 by Communication Manager module S, but without re-headering of the additional communication to use an header for the substrate network since the communication will not travel over the interconnection network. However, if computing nodes 205*a* and 205*c* are configured in a network topology for the virtual computer network to be separated by one or more logical networking devices, the Communication Manager module R may take additional actions to emulate the functionality of those logical networking devices.

While not illustrated with respect to FIG. 2A, in at least some embodiments other types of requests and communications may also be handled in various ways. For example, in at least some embodiments, an entity may have one or more computing nodes that are managed by Communication Manager module(s) and that are part of a managed virtual computer network for that entity, and may further have one or more other non-managed computing systems (e.g., computing systems that are directly connected to the interconnection network 250 and/or that natively use the same network addressing protocol as that of the interconnection network) that do not have an associated Communication Manager module that manages their communications. If the entity desires that those non-managed computing systems be part of that virtual computer network or otherwise communicate with the managed computing nodes of the virtual computer network, such communications between managed computing nodes and non-managed computing systems may be handled by the Communication Manager module(s) that manage the one or more computing nodes in at least some such embodiments. For example, in such situations, if such a non-managed computing system is provided with an actual destination substrate network address for such a managed computing node, the non-managed computing system may send communications to the associated Communication Manager module for that managed computing node via interconnection network 250 using that destination substrate network address, and that Communication Manager module would provide those communications to that computing node (e.g., after re-headering the communications in a manner similar to that previously described) if the Communication Manager module is configured to accept communications from that non-managed computing system (or from any non-managed computing system). Furthermore, the Communication Manager module may generate a dummy virtual network address to correspond to such a non-managed computing system, map it to the actual substrate network address for the non-managed computing system, and provide the dummy virtual network address to its managed computing node (e.g., as the source address for the communications forwarded to the computing node from the non-managed computing system), thus allowing the computing node to send communications to the non-managed computing system.

In addition, as previously noted, a communication manager module manages communications for associated computing nodes in various ways, including in some embodiments by assigning virtual network addresses to computing nodes of a provided virtual computer network, and/or by assigning substrate physical network addresses to managed computing nodes from a range of substrate physical network addresses that correspond to the communication manager module. In other embodiments, some such activities may instead be performed by one or more computing nodes of the virtual computer network, such as to allow a DHCP (Dynamic Host Configuration Protocol) server or other device of a virtual computer network to specify virtual network addresses for particular computing nodes of the virtual network. In such embodiments, the communication manager module obtains such configuration information from the virtual computer network device(s), and updates its mapping information accordingly (and in some embodiments may further update one or more system manager modules that maintain information about computing nodes associated with virtual networks). In yet other embodiments, a user or other entity associated with a virtual computer network may directly configure particular computing nodes to use particular virtual network addresses. If so, the communication manager modules and/or system manager module may track which virtual network addresses are used by particular computing nodes, and similarly update stored mapping information accordingly.

FIG. 2B illustrates some of the computing nodes and communications discussed with respect to FIG. 2A, but provides additional details with respect to some actions taken by the Communication Manager modules 210 and 260 and/or the System Manager module 290 to authorize communications between computing nodes. For example, after computing node A sends message 220-a to request a hardware address for computing node G, Communication Manager module R may perform one or more interactions 225 with the System Manager module 290 in order to determine whether to provide that information, such as based on whether computing node A is authorized to communicate with computing node G, as well as to determine a corresponding substrate physical network address for computing node G based on interconnection network 250. If the Communication Manager module R has previously obtained and stored that information and it remains valid (e.g., has not expired), then the interactions 225 may not be performed. In this example, to obtain the desired physical network address corresponding to computing node G, Communication Manager module R sends a message 225-1 to the System Manager module 290 that includes the virtual network addresses for computing nodes A and G, and that includes an entity network identifier for each of the computing nodes, which in this example is an entity network identifier for the managed virtual computer network of entity Z (e.g., a 32-bit or 24-bit unique identifier). In at least some embodiments, Communication Manager module R may send message 225-1 to the System Manager module 290 using an anycast addressing and routing scheme, so that multiple System Manager modules (not shown) may be implemented (e.g., one for each data center that includes Communication Manager modules and associated computing nodes) and an appropriate one of those (e.g., the nearest, the most underutilized, etc.) is selected to receive and handle the message.

After the System Manager module 290 determines that computing node A is authorized to communicate with computing node G (e.g., based on having the same entity network identifier, based on computing node A having an entity network identifier that is authorized to communicate with computing nodes of the entity network identifier for computing node G, based on other information provided by or associated with computing node A indicating that computing node A is authorized to perform such communications, based on information provided by or associated with computing node G indicating that computing node A is authorized to perform such communications, etc.), the System Manager module 290 returns a response message 225-2 that includes the desired actual physical substrate network address corresponding to computing node G. In addition, in at least some embodiments, before sending the desired actual physical network address, the System Manager module 290 may further verify that Communication Manager module R is authorized to send the message 225-1 on behalf of computing node A, such as based on computing node A being determined to be one of the computing nodes to which Communication Manager module R is associated.

In other embodiments, Communication Manager module R may perform some or all of the actions described as being performed by System Manager module 290, such as to maintain provisioning information for the various computing nodes and/or to determine whether computing node A is authorized to send communications to computing node G, or instead no such authorization determination may be performed in some or all situations. Furthermore, in other embodiments, other types of authorization determinations may be performed for a communication between two or more computing nodes, such as based on a type of the communication, on a size of the communication, on a time of the communication, etc.

As previously noted with respect to FIG. 2A, after Communication Manager module S receives communication 230-3 intended for computing node G via the interconnection network 250, Communication Manager module S may perform one or more interactions 240 with the System Manager module 290 in order to determine whether to authorize that communication. In particular, in this example, to verify that the communication 230-3 is valid and authorized to be forwarded to computing node G, Communication Manager module S first extracts information from the encoded communication 230-3 that indicates the overlay virtual computer network source and destination virtual network addresses for computing nodes A and G and optionally the entity network identifier(s) for those computing nodes (e.g., from header fields in the encoded communication, or by extracting embedded information in the actual destination substrate network address and actual source substrate network address of the encoded communication 230-3). The Communication Manager module S next exchanges messages 240 with System Manager module 290 to obtain the corresponding actual substrate physical network address for the sending computing node A on behalf of computing node G, including a message 240-4 that includes the extracted virtual network addresses for computing nodes A and G in the overlay virtual computer network, as well as the entity network identifier for each of the computing nodes. In at least some embodiments, Communication Manager module S may send message 240-4 to the System Manager module 290 using an anycast addressing and routing scheme as previously described.

The System Manager module 290 receives message 240-4, and returns a response message 240-5 that includes the actual physical substrate network address corresponding to computing node A (e.g., "200.0.0.3" or "::0A:01:<Z-identifier>:10.0.0.2"). As previously discussed with respect to messages 225-1 and 225-2, in some embodiments the System Manager module 290 and/or Communication Manager module S may further perform one or more other types of authorization determination activities, such as to determine that computing node G is authorized to communicate with computing node A, that Communication Manager module S is authorized to send the message 240-4 on behalf of computing node G, etc. Communication Manager module S then verifies that the returned physical substrate network address in response message 240-5 matches the source substrate network address used to send the encoded communication 230-3 over the substrate network, so as to prevent attempts to spoof messages as being from computing node A that are actually sent from other computing nodes in other locations. Communication Manager module S optionally stores this received information from response message 240-5 as part of an entry for computing node A in mapping information 262 for later use, along with computing node A's virtual network address and a virtual hardware address for computing node A.

FIGS. 2C and 2D illustrate further examples of managing ongoing communications for the overlay virtual computer network described with respect to FIGS. 2A and 2B for client entity Z, but with communications being managed to support the use of multiple alternative network paths through the substrate network with multi-part messages encoded for certain communications that are sent. In particular, FIG. 2C illustrates computing nodes A and C, Communication Manager module R, System Manager module 290, and interconnection network 250 at a first geographical location 265, in a manner similar to that shown in FIGS. 2A and 2B. However, FIG. 2C further illustrates additional information regarding an external computer system A 270a that is located remotely from the first geographical location and regarding multiple alternative edge devices 255 at the first geographical location, and the System Manager module 290 maintains and uses additional information 296 regarding alternative network paths that are available for use between particular locations, including by using those alternative edge devices as part of multiple alternative network paths from the first geographical location to the remote geographical location of the external computer system A.

In this example, the first geographical location 265 at which the computing nodes A and C, Communication Manager module R, System Manager module 290, interconnection network 250, and edge devices 255 are co-located may be, for example, a single data center, and the external computer system A is located at another location remote from the first location (e.g., with a WAN interconnecting the external computer system A and the computing nodes A and B at the first geographical location). For the purposes of this example, the edge devices 255 manage communications sent between the first location and other locations, including to modify outgoing substrate communications that are leaving the first location and that are encoded for the substrate network 250 in a manner analogous to that previously described for Communication Manager module S and substrate communication 230-3, as described below. The edge devices 255 may further provide a variety of types of other functionality in at least some embodiments, as described in greater detail elsewhere. In this example, however, the edge devices 255 do not decode multi-part messages that are sent to the external computer system A, with such multi-part messages instead being decoded by a communication manager module (not shown) or other module that is associated with the external computer system A, although in other embodiments one or more of the edge devices may perform such decoding operations for an encoded multi-part message before forwarding the resulting original communication to the external computer system A.

In particular, in this example, computing node A determines to send a communication to external computer system A, and accordingly sends outgoing communication 224-g in a manner similar to that described with respect to FIG. 2A for outgoing communication 220-c. While not illustrated in FIG. 2C, computing node A may optionally have previously exchanged one or more other messages with Communication Manager module R to determine a hardware address to use to represent external computer system A (e.g., in a manner similar to that described with respect to FIG. 2A for communications 220-a and 220b). Thus, the outgoing communication sent by source computing node A includes a destination network address of "20.0.5.3" for the intended final destination of external computer system A, a source virtual network address of "10.0.0.2" for computing node A as part of the overlay virtual computer network, and source and destination hardware addresses used to represent computing node A and external computer system A, respectively (e.g., a virtual hardware address used to represent external computer system A that was previously provided to computing node A by Communication Manager module R).

The outgoing communication 224-g is intercepted and handled by Communication Manager module R in a manner similar to that described in FIG. 2A for communication 220-c. However, before encoding the outgoing communication for the substrate network as described with respect to FIGS. 2A and 2B, the Communication Manager module R in this example automatically determines to encode and send the outgoing communication as a multi-part message, such as based on the availability of multiple alternative network paths between computing node A and the external computer system A. In particular, in this example, seven alternative communication links (not shown) are available for use in sending communications from the first geographical location to the location of the external computer system A, with each of the alternative communication links being associated with one of the seven edge devices 255a-255g, and with each of the seven alternative communication links being part of an alternative network path for use in forwarding communications from computing node A to the external computer system A. Communication Manager module R may determine that the seven alternative network paths are available to use with the outgoing communication in this example by performing interactions 228 with the System Manager module 290 to obtain corresponding information 296, such as upon receiving the outgoing communication 224-g or instead at an earlier time (e.g., as part of response information that is received from the System Manager module 290 if computing node A previously performed an ARP request for external computer system A's network address of "20.0.5.3", in a manner similar to that of message 220-a of FIG. 2A). When Communication Manager module R obtains the alternative network path information for communications between its location and that of external computer system A, such as part of prior or current interactions 228, the Communication Manager module R stores that information as part of mapping information 212c, such as in a manner similar to that described with respect to mapping information 212 in FIG. 2A (e.g., by modifying mapping information 212 of FIG. 2A). As discussed in greater detail previously, the Communication Manager module R and/or the System Manager module 290 may further perform various optional authentication activities to verify that communications from computing node A to external computer system A are authorized.

In this example, since seven alternative network paths are available, the Communication Manager module R determines to encode the outgoing communication into 7 parts, with the original communication being decodable from any 5 of those 7 parts, and proceeds to create those 7 message parts using a defined erasure code. The Communication Manager module R then proceeds to forward each of the 7 message parts along one of the 7 alternative network paths, although the sending of only 2 of the 7 message parts is illustrated in FIG. 2C for the sake of brevity. Thus, with respect to a first of the 7 message parts that are encoded from the intercepted outgoing communication 224-g, the Communication Manager module R determines that edge device G is an intermediate destination for the alternative network path selected for the first message part, identifies the physical substrate network address corresponding to edge device G (in this example, "100.0.0.23") that is to be used for the first message part communication, and creates a modified communication 234-7 based on the first message part that is encoded for the substrate network 250. In a manner similar to that described previously, the encoded communication 234-7 has a new substrate network header that includes the physical substrate network address for edge device G as the destination network address, and that includes computing node A's substrate network address as the source network address. The encoded communication 234-7 is then forwarded over the interconnection network 250 to edge device G based on the destination network address included in the encoded communication. Similarly, with respect to another of the 7 message parts, the Communication Manager module R determines that edge device A is an intermediate destination for the alternative network path selected for that message part, identifies the physical substrate network address corresponding to edge device A (in this example, "100.0.0.17") that is to be used for that message part communication, creates a modified communication 234-10 that is encoded for the substrate network 250, and forwards the modified communication 234-10 to the interconnection network 250 for further forwarding to edge device A. The other 5 message parts are similarly forwarded to the other edge devices 255b-255f, although those other edge devices and other forwarded communications are not explicitly illustrated in this example.

When edge device G receives communication 234-7 via the interconnection network 250, it performs actions similar to those described in FIG. 2A with respect to Communication Manager module S for communication 230-3, including to decode the communication 234-7 by replacing the substrate network header of the communication 234-7 with a new header that indicates the destination network address "20.0.5.3" of the intended final destination, and a source network address corresponding to source computing node A (e.g., "10.0.0.2", or instead another network address and/or port used to represent computing node A to external computer systems, such as if the edge devices perform NAT/PAT functionality for the computing nodes at the first location). The edge device G then forwards the further modified communication as communication 259-9 to the external computer system A.

While not illustrated here, in other embodiments the edge device G may further be configured to optionally perform additional interactions with the System Manager module 290 before forwarding the received communication 234-7, such as to determine if the communication is authorized, to update mapping information used by the edge device G to determine the network address to use for the final destination (e.g., if the final destination's network address is not included in a header field or otherwise stored with the encoded communication 234-7), etc. Edge device A performs similar actions for received communication 234-10, which it modifies and further forwards to external computer system A as communication 259-12. While not illustrated, the other edge devices 255b-255f will similarly receive, modify and forward the other 5 message parts.

As previously noted, in this example the seven message parts are forwarded to external computer system A along the seven alternative network paths that are available for use. While not illustrated here, either external computer system A or an associated module (not shown), such as an associated communication manager module, receives at least some of the seven message parts that are sent by the edge devices 255a-255g, decodes the received message parts into the original outgoing communication 224-g using the defined erasure code, and provides the decoded original communication to external computer system A. Since only five of the seven message parts are needed to decode the multi-part message in this example, the decoding may be performed as soon as any five message parts have been received, regardless of whether the other two message parts are still being sent or have been lost. It will be appreciated that encoding and decoding of multi-part messages may be performed in other manners in other embodiments and situations. For example, despite the availability of seven alternative network paths, the Communication Manager module R may instead determine to use only a subset of those seven alternative network paths (e.g., only the two alternative network paths corresponding to edge device A and edge device G), or only two of the seven alternative network paths may be available for use at the time of sending the multi-part message. If so, the Communication Manager module R may determine to encode the outgoing communication 224-g in a different manner, such as, for example, to encode the outgoing communication into four message parts, of which three are needed for decoding—the Communication Manager module R may then, for example, forward two of the four message parts along each of the two alternative network paths being used. It will be appreciated that a variety of other types of encoding and decoding may similarly be used.

FIG. 2D illustrates an example similar to that of FIG. 2C, but with different types of alternative network paths used to forward a multi-part message. In particular, FIG. 2D illustrates computing nodes A and H, Communication Manager modules R and S, System Manager module 290, and interconnection network 250, in a manner similar to that shown in FIG. 2A. However, in the example of FIG. 2D, the computing system (not shown) used to provide the Communication Manager module R includes two alternative network interfaces 213 from which communications may be sent to the interconnection network 250, which may each be used at part of at least one alternative network path between the location of Communication Manager module R and other network locations.

In particular, in the example of FIG. 2D, computing node A determines to send a communication to computing node H, and accordingly sends outgoing communication 226-h in a manner similar to that described with respect to FIG. 2A for outgoing communication 220-*c* and with respect to FIG. 2C for outgoing communication 224-*g*. While not illustrated in FIG. 2D, computing node A may optionally have previously exchanged one or more other messages with Communication Manager module R to determine a hardware address to use to represent computing node H (e.g., in a manner similar to that described with respect to FIG. 2A for communications 220-*a* and 220*b*). Thus, the outgoing communication 226-*h* sent by source computing node A includes a destination network address of "10.1.5.3" for the intended final destination of computing node H, a source virtual network address of "10.0.0.2" for computing node A as part of the overlay virtual computer network, and source and destination hardware addresses used to represent computing node A and computing node H, respectively (e.g., a virtual hardware address used to represent computing node H that was previously provided to computing node A by Communication Manager module R).

The outgoing communication 226-*h* is intercepted and handled by Communication Manager module R in a manner similar to that described in FIG. 2C for communication 224-*g*. In particular, before encoding the outgoing communication for the substrate network as described with respect to FIGS. 2A and 2B, the Communication Manager module R in this example automatically determines to encode and send the outgoing communication as a multi-part message, such as based on the availability of multiple alternative network paths between computing node A and computing node H. In particular, in this example, the two alternative network interfaces 213*a* and 213*b* are available for use in sending communications from computing node A to computing node H, with each of the two network interfaces being part of an alternative network path for use in forwarding communications from Communication Manager module R. Communication Manager module R may determine that the two alternative network paths are available to use with the outgoing communication in this example in various manners, such as based on prior configuration information stored for the Communication Manager module R and/or by performing interactions 229 with the System Manager module 290 to obtain corresponding information 296, such as upon receiving the outgoing communication 226-*h* or instead at an earlier time (e.g., as part of response information that is received from the System Manager module 290 if computing node A previously performed an ARP request for computing node H's network address of "10.1.5.3", in a manner similar to that of message 220-*a* of FIG. 2A). When Communication Manager module R obtains the alternative network path information for communications between its location and that of computing node H, the Communication Manager module R stores that information as part of mapping information 212*d*, such as in a manner similar to that described with respect to mapping information 212 in FIG. 2A. As discussed in greater detail previously, the Communication Manager module R and/or the System Manager module 290 may further perform various optional authentication activities to verify that communications from computing node A to computing node H are authorized.

In this example, since two alternative network paths are available, the Communication Manager module R determines to encode the outgoing communication into a quantity of parts that is a multiple of two (e.g., two, four, six, eight, etc.), and proceeds to create that quantity of message parts using a predefined erasure code. The Communication Manager module R then proceeds to forward each of the message parts along one of the two alternative network paths, although the sending of only 2 of the message parts is illustrated in FIG. 2D for the sake of brevity. Thus, with respect to a first of the message parts that are encoded from the intercepted outgoing communication 226-*h*, the Communication Manager module R determines to send the message part communication from alternative network interface 213*a*, identifies the physical substrate network address corresponding to destination computing node H (in this example, "200.20.3.0") that is to be used as the destination network address for the first message part communication, identifies the physical substrate network address corresponding to the selected network interface (in this example, "200.0.0.1") that is to be used as the source network address for the first message part communication, and creates a modified communication 236-13 based on the first message part that is encoded for the substrate network 250. The encoded communication 236-13 is then forwarded over the interconnection network 250 to Communication Manager module S based on the destination network address included in the encoded communication. Similarly, with respect to another of the encoded message parts, the Communication Manager module R determines to send that message part communication from alternative network interface 213*b*, identifies the physical substrate network address corresponding to destination computing node H (in this example, the same network address of "200.20.3.0" as for the first encoded message part communication) that is to be used as the destination network address for that message part communication, identifies the physical substrate network address corresponding to the selected network interface (in this example, "200.10.1.5") that is to be used as the source network address for that message part communication, creates a modified communication 236-16 based on that message part communication that is encoded for the substrate network 250, and forwards the modified communication 236-16 to the interconnection network 250 for further forwarding to Communication Manager module S. The other message parts are similarly forwarded to Communication Manager module S via one of the alternative network interfaces, although those other forwarded communications are not explicitly illustrated in this example.

When Communication Manager module S receives each of the communications 236-13 and 236-16 via the interconnection network 250, it performs actions similar to those described in FIG. 2A with respect to Communication Manager module S for communication 230-3, including to decode the communications 236-13 and 236-16 by replacing their substrate network headers with new headers that indicate the destination network address "10.1.5.3" of the intended final destination, and a source network address corresponding to source computing node A (e.g., "10.0.0.2"). While not illustrated here, in other embodiments the Communication Manager module S may further be configured to optionally perform additional interactions with the System Manager module 290 for each of one or more of the received message part communications to determine if the communication is authorized. In addition, while also not illustrated, the Communication Manager module S will similarly receive and modify the other forwarded message parts that are not dropped or otherwise lost while in transit over the interconnection network. After receiving sufficient message part communications of the multi-part message, Communication Manager module S removes the substrate network communication headers from the received message parts, and decodes the received message parts into the original outgoing communication 226-*h* using the predefined erasure code. The Communication Manager module S may further optionally modify the original outgoing communication 226-*h* to have a header corresponding to the overlay virtual computer network for entity Z, such as in a manner similar to that for modified communication 245-e of FIG. 2A. The Communication Manager module S then provides the decoded original communication as optionally modified to computing node H as communication 247-e. It will be appreciated that encoding and decoding of multi-part messages may be performed in other manners in other embodiments and situations, and that a variety of types of encoding and decoding schemes may be used.

In this manner, the CNS system may provide functionality corresponding to the use of multiple alternative network paths within a substrate network, without any special configuration of the computing nodes of the managed virtual computer network or of the physical devices of the intervening substrate interconnection network, based on the Communication Manager modules overlaying the virtual computer network on the actual physical interconnection network in such a manner as to provide the desired functionality. In this manner, multiple modules of the CNS system may operate together in a distributed manner to provide desired functionality, optionally in a manner that is transparent to the computing nodes of the managed virtual computer networks.

Various other types of actions than those discussed with respect to FIGS. 2A-2D may be performed in other embodiments, including for types of network addressing protocols other than IPv4 and/or IPv6.

In addition, as previously noted, configuration information that is specified for a virtual computer network may include various network topology information, and various computing nodes may be selected for the virtual computer network and configured in accordance with the network topology in various manners. For example, in some embodiments, the selection of a computing node to be used in a managed virtual computer network and/or to be assigned a particular role in a configured network topology may be based at least in part on a geographical and/or network location of the computing node, such as an absolute location, or instead a location relative to one or more other computing resources of interest (e.g., other computing nodes of the same managed virtual computer network, storage resources to be used by the computing node, etc.), such as within a minimum and/or maximum specified geographical distance or other degree of proximity to an indicated other computing resource or other location. In addition, in some embodiments, factors used when selecting a computing node may be not be based on location, such as to include one or more of the following: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; etc.

As previously noted, in some embodiments, a program execution service executes third-party customers' programs using multiple physical computing systems (e.g., in one or more data centers) that each host multiple virtual machines, with each virtual machine being able to execute one or more programs for a customer. In some such embodiments, customers may provide programs to be executed to the program execution service, and may reserve execution time and other resources on physical or virtual hardware facilities provided by the program execution service. In addition, customers and/or the program execution service may define virtual computer networks that will be used by the program execution service for computing nodes of the customer, so as to transparently provide computing nodes of a virtual computer network with the appearance of operating on a dedicated physical network.

In addition, the CNS system may in at least some embodiments establish and/or maintain virtual computer networks via the operation of one or more communication manager modules at the edge of one or more intermediate physical networks, such as by configuring and otherwise managing communications for the virtual computer networks. In some situations, a communication manager module tracks or otherwise determines the virtual computer networks to which the module's associated computing nodes belong (e.g., based on entities on whose behalf the virtual computer networks operate) as part of managing the communications for the virtual computer networks. The determination by a communication manager module of a corresponding virtual computer network for a computing node may be performed in various ways in various embodiments, such as by interacting with a system manager module that provides that information, by tracking software programs executing on such computing nodes, by tracking entities associated with such computing nodes, etc. For example, when a particular computing node begins to execute one or more software programs on behalf of a user, and that user also has other software programs executing on other computing nodes, the new computing node executing the user's program(s) may be selected to be associated with a virtual computer network for the user that includes those other computing nodes. Alternatively, a user or other entity may specify a particular managed computer network to which a computing node belongs, such as if the entity maintains multiple distinct managed computer networks between different groups of computing nodes. In addition, in at least some embodiments, one or more system manager modules of the CNS system may facilitate configuring communications between computing nodes, such as by tracking and/or managing which computing nodes belong to which virtual computer networks (e.g., based on executing programs on behalf of a customer or other entity), and by providing information about actual physical substrate network addresses that correspond to virtual network addresses used for a particular virtual computer network (e.g., by a particular customer or other entity).

Figure 3:
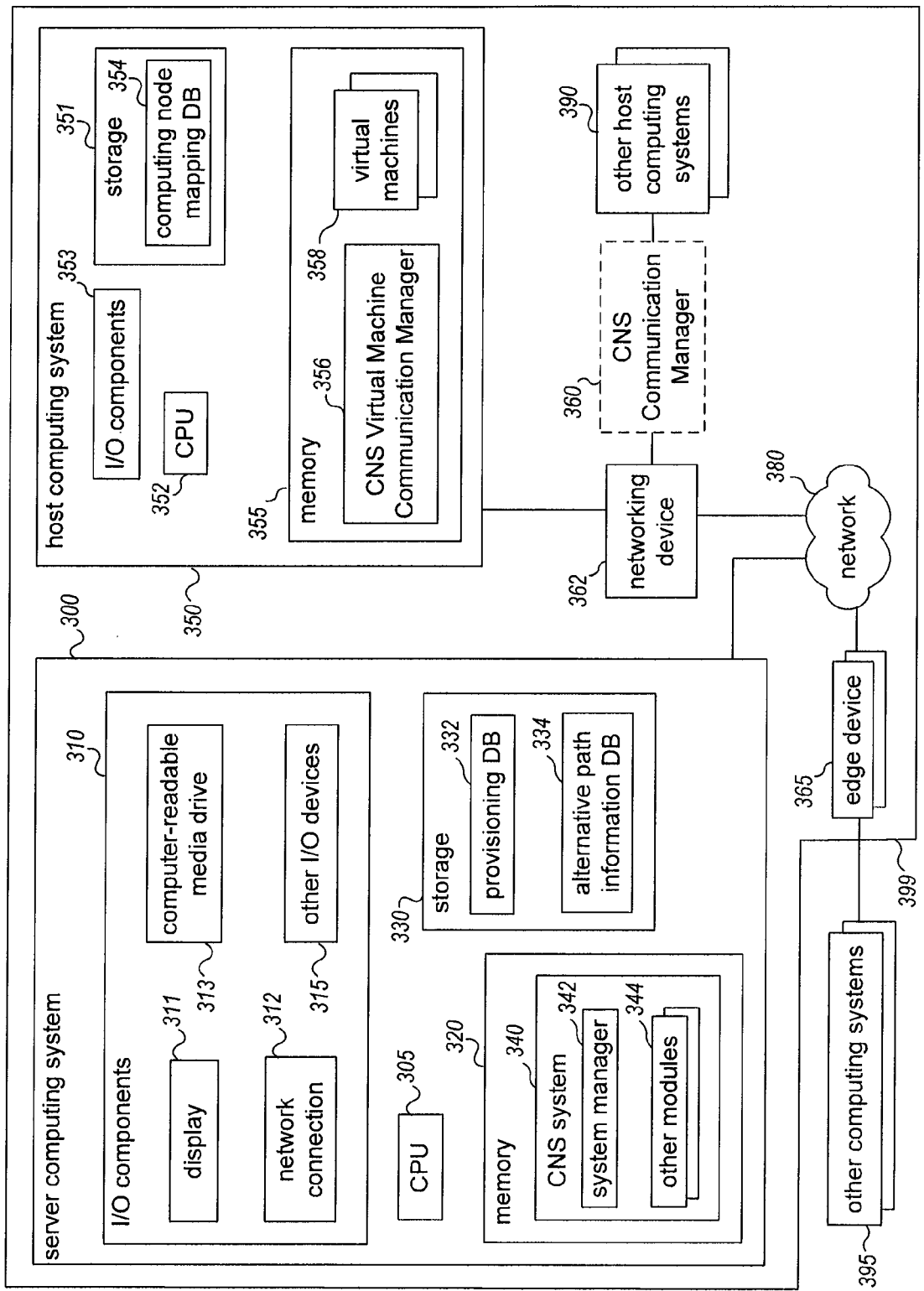
FIG. 3 is a block diagram illustrating example computing systems suitable for executing an embodiment of a system for managing communications between computing nodes.

FIG. 3 is a block diagram illustrating example computing systems suitable for executing an embodiment of a system for managing communications between computing nodes. In particular, FIG. 3 illustrates a group 399 of computing systems and inter-network(s), such as a data center or other group of co-located computing nodes. In some embodiments, some or all of the computing systems of the group 399 may be used by an embodiment of the CNS system to provide managed virtual computer networks to users or other entities. The group 399 includes a server computing system 300, a host computing system 350 capable of executing one or more virtual machines, other host computing systems 390 that are similar to host computing system 350, and an optional Communication Manager module 360 that manages host computing systems 390 and that executes on one of the computing systems 390 or on another computing system (not shown). The server computing system 300 and host computing systems 350 and 390 are connected to one another via an internal network 380, which includes a networking device 362 and other networking devices (not shown). The network 380 may be an interconnection network that joins multiple disparate physical networks (not shown) for the group 399 and possibly provides access to external networks (not shown) and/or systems, such as other computing systems 395. In the illustrated example, the networking device 362 provides a gateway between the network 380 and host computing systems 350 and 390. In some embodiments, networking device 362 may, for example, be a router or a bridge. In addition, in this example, multiple alternative edge devices 365 may be used to connect the internal network 380 at the location 399 to external computer systems at other locations.

The computing system 300 in this example operates to configure and manage virtual computer networks within the group 399, as well as to provide other functions (e.g., the provisioning, initialization, and execution of programs on computing nodes). The computing system 300 includes a CPU 305, various I/O components 310, storage 330, and memory 320. The I/O components in this example include a display 311, network connection 312, computer-readable media drive 313, and other I/O devices 315 (e.g., a mouse, keyboard, speakers, etc.).

The host computing system 350 operates to host one or more virtual machines, such as for use as computing nodes in managed virtual computer networks (e.g., computing nodes that execute programs on behalf of various users). The host computing system 350 includes a CPU 352, various I/O components 353, storage 351, and memory 355. While not illustrated here, the I/O components 353 may include similar components to those of I/O components 310. A virtual machine Communication Manager module 356 and one or more virtual machines 358 are executing in the memory 355, with the module 356 managing communications for the associated virtual machine computing nodes 358, and in some embodiments including various software instructions that when executed program the CPU 352 to provide the described functionality. The Communication Manager module 356 maintains various mapping information 354 on storage related to the computing nodes 358 and other computing nodes, such as in a manner similar to mapping information 212, 212c, 212d, 262 and 262d of FIGS. 2A-2D. The structure of the other host computing systems 390 may be similar to that of host computing system 350, or instead some or all of the host computing systems 350 and 390 may act directly as computing nodes by executing programs without using hosted virtual machines. In a typical arrangement, the group 399 may include hundreds or thousands of host computing systems such as those illustrated here, organized into a large number of distinct physical sub-networks and/or networks.

An embodiment of a CNS system 340 is executing in memory 320 of the computing system 300. In some embodiments, the system 340 may receive an indication of multiple computing nodes to be used as part of a managed virtual computer network (e.g., one or more virtual machine computing nodes on host computing system 350 or one or more computing nodes using one of the host computing systems 390), and in some situations may select the particular computing node(s) for the managed virtual computer network. In some cases, information about the structure and/or membership of various managed virtual computer networks may be stored in the provisioning database 332 on storage 330 by the system 340, and provided to the Communication Manager modules at various times. Similarly, in some cases, information about alternative network paths that are available to be used by one or more managed virtual computer networks, such as information about physical network structures and/or current network operational characteristics, may be stored in the database 334 on storage 330 by the system 340, such as in a manner similar to information 296 of FIGS. 2C and 2D, and used to provide corresponding information to the Communication Manager modules at various times. In this example, the system 340 in memory 320 includes a system manager module 342 and optionally other modules 344, with the communication manager modules 356 and 360 being a further part of the distributed CNS system in this example. The system module 342 performs operations to facilitate the use of alternative network paths with multi-part messages encoded for communications for managed computer networks, as discussed elsewhere. In addition, the CNS system and the modules 342 and 344 may each in some embodiments include various software instructions that when executed program the CPU 305 to provide described functionality.

As discussed in greater detail elsewhere, the Communication Manager modules 356 and 360 (and other Communication Manager modules, not shown, that manage other associated computing nodes, not shown) and the various modules 342 and 344 of the system 340 may interact in various ways to manage communications between computing nodes, including to select and use particular alternative network paths to forward multi-part messages encoded for particular communications from computing nodes of provided virtual computer networks. Such interactions may, for example, enable the computing nodes 358 and/or other computing nodes to intercommunicate over managed virtual computer networks without any special configuration of the computing nodes, by overlaying the virtual computer networks over network 380 and optionally one or more external networks (not shown) without any special configuration of networking device 362 or other networking devices (not shown), and without encapsulation of communications.

It will be appreciated that computing systems 300, 350, 390, and 395, edge devices 365, and networking device 362, are merely illustrative and are not intended to limit the scope of the present invention. For example, computing systems 300 and/or 350 may be connected to other devices that are not illustrated, including through one or more networks external to the group 399, such as the Internet or via the World Wide Web ("Web"). More generally, a computing node or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules, such as if the functionality of a system manager module and one or more communication manager modules are instead combined into a single module. Similarly, in some embodiments the functionality of some of the illustrated modules may not be provided and/or other additional functionality may be available. Furthermore, in some embodiments, various alternative network communication links of one or more types may be present and in use.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
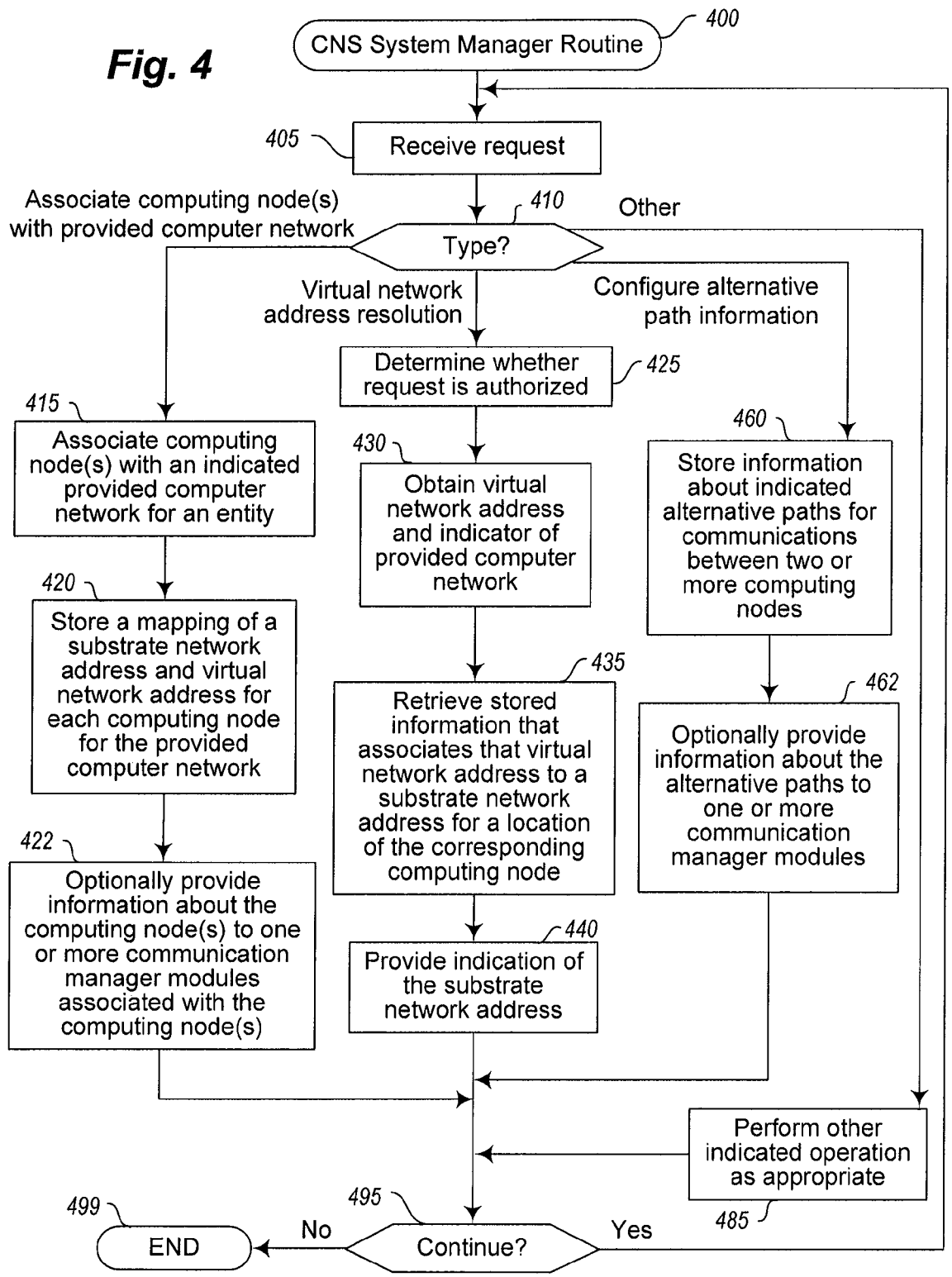
FIG. 4 illustrates a flow diagram of an example embodiment of a CNS System Manager routine.

FIG. 4 is a flowchart of an example embodiment of a CNS System Manager routine 400. The routine may be provided by, for example, execution of the system manager module 110 of FIGS. 1A and/or 1B, the system manager module 290 of FIGS. 2A-2D, and/or the system manager module 342 of CNS system 340 of FIG. 3, such as to assist in managing communications between multiple computing nodes across one or more intermediate networks, including to using multiple alternative network paths in one or more substrate networks, as well as to perform other types of management operations in some situations. In at least some embodiments, the routine may be provided as part of a system that manages communications for multiple different entities across a common intermediate substrate network, with the communications configured so as to enable each computing node to transparently communicate with other associated computing nodes using a private virtual computer network that is specific to that entity. Furthermore, the routine may facilitate preventing unauthorized communications from being provided to destination computing nodes, such as by assisting Communication Manager modules with determinations of whether communications are authorized.

In the illustrated embodiment, the routine begins at block 405, where a request is received. The routine continues to block 410 to determine the type of request. If it is determined that the type of request is to associate one or more computing nodes with a particular managed virtual computer network provided for an indicated entity, such as if those computing nodes are executing or are to execute one or more programs on behalf of that entity, the routine continues to block 415 to associate those computing nodes with that indicated entity and virtual computer network. In some embodiments, the routine may further determine the one or more computing nodes to be associated with the indicated entity and virtual computer network, such as based on information provided by the indicated entity, while in other embodiments the selection of such computing nodes and/or execution of appropriate programs on those computing nodes may be performed in other ways. In addition, as discussed in greater detail elsewhere, in some embodiments one or more of the computing nodes may each be a virtual machine that is hosted by one or more physical computing systems. The routine then continues to block 420 to store mapping information for the computing nodes and the managed virtual computer network. In particular, in the illustrated embodiment the routine stores for each computing node an indication of a physical substrate network address corresponding to the computing node, a virtual network address used by the entity for the computing node as part of the virtual computer network, optionally a virtual hardware address assigned to the computing node, and an indication of the associated entity. As discussed in greater detail elsewhere, the physical substrate network address corresponding to the computing node may in some embodiments be a substrate network address specific to that single computing node, while in other embodiments may instead refer to a sub-network or other group of multiple computing nodes, such as may be managed by an associated Communication Manager module. After block 420, the routine continues to block 422 to optionally provide information about the computing nodes and their configuration to one or more communication manager modules associated with those computing nodes, although in other embodiments instead provides such information upon request from the communication manager modules.

If it is instead determined in block 410 that the type of received request is a request for address resolution for a virtual network address of a target computing node or other computer system of interest, such as from a communication manager module on behalf of a managed computing node, the routine continues instead to block 425, where it determines whether the request is authorized in one or more ways, such as based on whether the managed computing node on whose behalf the request is made is authorized to send communications to a computing node whose virtual network address resolution is requested (e.g., based on the virtual computer network(s) to which the two computing nodes belong), based on whether the managed computing node on whose behalf the request is made is a valid computing node that is currently part of a configured virtual computer network, and/or based on whether the request is received from the communication manager module that actually manages the indicated computing node on whose behalf the request is made. If the request is determined to be authorized, the routine continues to block 430, where it obtains a network address of interest for a particular target of interest, such as may be included with the request received in block 405, or previously stored and currently identifiable for the target based on other received information. The routine then continues to block 435 to retrieve stored information for the target that is associated with the network address, and in particular to retrieve information that associates that target network address to a physical substrate network address for a network location that corresponds to the target, such as may be previously stored with respect to block 420, and optionally to other information for the target network address (e.g., an associated virtual hardware address, an indication regarding whether the target network address corresponds to a physically implemented computing node with an actual substrate network address or instead to a logical networking device that does not have an actual substrate network address, information about a role or status of the device corresponding to the virtual network address with respect to configured network topology information, whether the target network address is external to a current location such that communications to the target will use one or more intermediate destination edge devices, whether communications to the target network address will use one or more intermediate destinations other than edge devices, information about possible alternative network paths between the requester and the target, etc.). After block 435, the routine continues to 440 to provide an indication of the retrieved information to the requester. While not illustrated here, if the determination in block 425 determines that the request is not authorized, the routine may instead not perform blocks 430-440 for that request, such as by responding with an error message to the request received in block 405 or not responding to that received request. In addition, in other embodiments the routine may perform one or more other tests to validate a received request before responding with the requested information, such as to verify that the computing node that initiated the request is authorized to receive that information. Furthermore, in the illustrated embodiment, communication manager modules perform operations to select particular alternative network paths to use for multi-part messages encoded for particular communications, as described in greater detail with respect to blocks 581-589 of FIG. 5C, such as in an individualized manner for each of at least some communications, although in other embodiments the routine 400 may instead perform some or all such actions (e.g., as part of block 435).

If it is instead determined in block 410 that the received request is to configure information regarding alternative network paths, the routine continues to block 460. In block 460, the routine obtains information that corresponds to alternative network paths between two or more pairs of locations, such as structural information about alternative communication links in one or more locations (e.g., initial configuration information, dynamic updates about temporary and/or permanent changes to availability of particular alternative communication links, etc.) and/or information about current conditions (e.g., current network operational characteristics of particular alternative communication links and/or paths). The obtained information may further in some embodiments and situations include information about how to access and use particular alternative network paths, such as one or more substrate network addresses to be used from a particular location to initiate use of a particular alternative network path (e.g., one or more substrate network addresses associated with a series of one or more alternative communication links and/or intermediate destinations). After block 460, the routine continues to block 462 to optionally provide information about the alternative network paths to one or more communication manager modules that are in locations for which those alternative network paths are available, although in other embodiments instead provides such information upon request from the communication manager modules.

If it is instead determined in block 410 that the received request is of another type, the routine continues instead to block 485 to perform another indicated operation as appropriate. For example, in some embodiments, the routine may receive requests to update stored information about particular computing nodes, such as if a particular computing node was previously associated with a particular entity and/or virtual computer network but that association ends (e.g., one or more programs being executed for that entity on that computing node are terminated, the computing node fails or otherwise becomes unavailable, an associated user or other client changes specified configuration information for the computing node, etc.). Similarly, in some embodiments, the routine may receive requests to update stored information about particular alternative network paths (e.g., to reflect particular alternative communication links and/or alternative intermediate destinations), such as to add or remove information about particular communication links or intermediate destinations, change network addresses associated with accessing particular communication links and/or destinations, etc. The routine may also perform a variety of other actions related to managing a system of multiple computing nodes, as discussed in greater detail elsewhere, and may at times perform actions of other types, such as to perform occasional housekeeping operations to review and update stored information as appropriate (e.g., after predefined periods of time have expired). In addition, if possible validation problems are detected, such as with respect to received address resolution requests for virtual network addresses, the routine may take various actions to signal an error and/or perform other corresponding actions as appropriate.

After blocks 422, 440, 462 or 485, the routine continues to block 495 to determine whether to continue, such as until an explicit indication to terminate is received. If it is determined to continue, the routine returns to block 405, and if not continues to block 499 and ends.

Figure 5B:
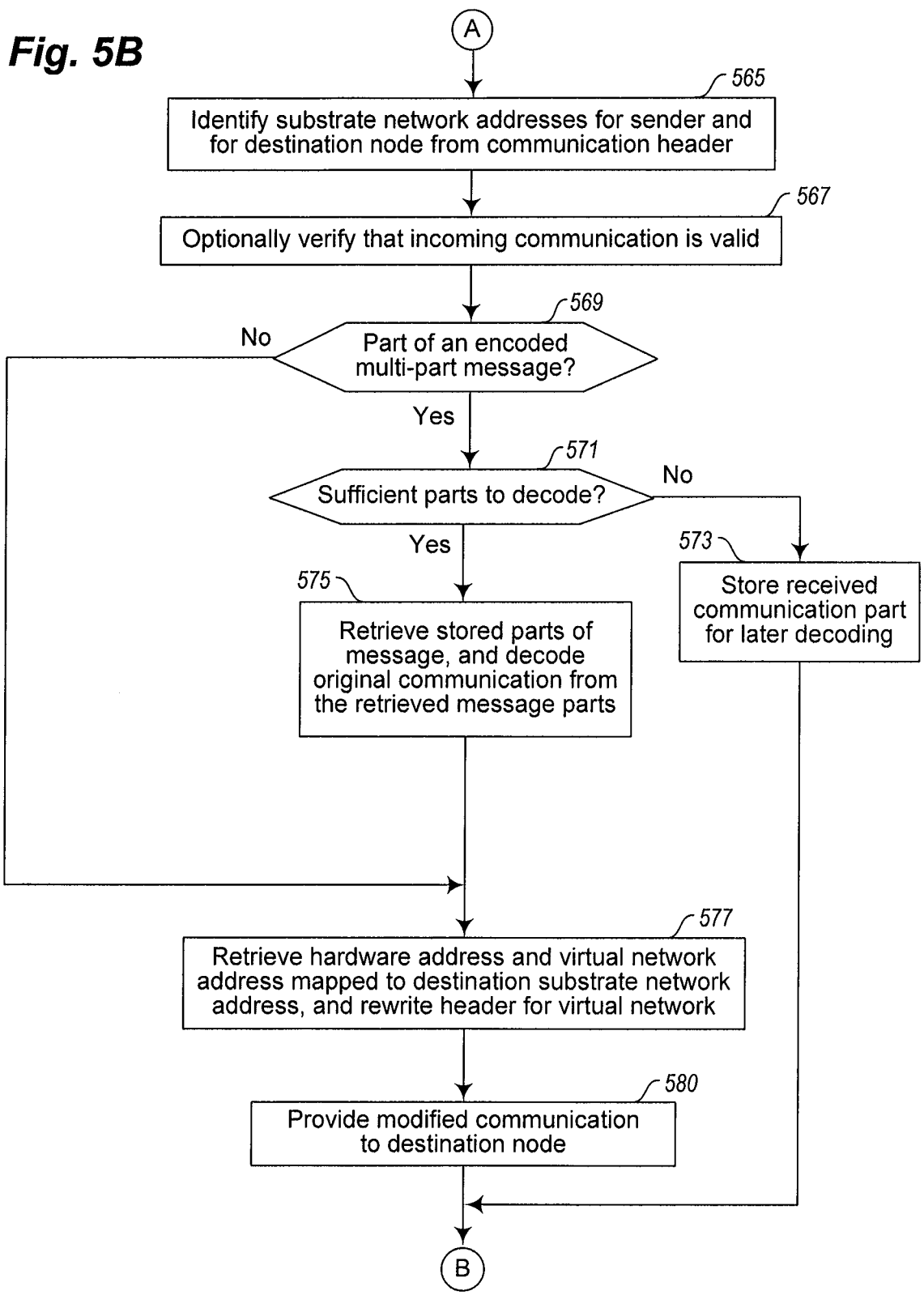

FIGS. 5A-5C are a flow diagram of an example embodiment of a CNS Communication Manager routine 500. The routine may be provided by, for example, execution of the Communication Manager modules 109a, 109b, 109c, 109d and/or 150 of FIG. 1B, the Communication Manager modules 210 and/or 260 of FIGS. 2A-2D, the Communication Manager modules 356 and/or 360 of FIG. 3, and/or a communication manager module (not shown) of the CNS service 105 of FIG. 1A, such as to manage communications to and from an associated group of one or more computing nodes in order to provide a private virtual computer network over one or more shared intermediate networks, including to determine whether to authorize communications to and/or from the managed computing nodes, and to support use of alternative network paths for at least some communications to and/or from computing nodes of one or more managed virtual computer networks that are encoded into multi-part messages.

The routine begins at block 505, where an indication is received of a node communication or other message. The routine continues to block 510 to determine the type of communication or other message and proceed accordingly. If it is determined in block 510 that the message is a request from an associated managed computing node for network address resolution, such as an ARP request, the routine continues to block 515 to identify the target network address of interest indicated in the request. The routine then continues to block 520 to send a request to a system manager module for network address resolution for the indicated target network address for the virtual computer network that is associated with the computing node that provided the request, such as discussed with respect to blocks 425-440 of FIG. 4. As discussed in greater detail elsewhere, the routine may in some embodiments track information about virtual computer networks and/or entities associated with each managed computing node, as well as one or more alternative network paths that are each available for use with communications from one or more managed computing nodes, while in other embodiments at least some such information may instead be provided to the routine by the computing nodes and/or by the system manager module, or instead the system manager module may track and store that information without it being provided to and tracked by the current routine. While not illustrated here, in other embodiments and situations such address resolution requests may be handled in other manners. For example, if a computing node being managed by a particular communication manager module provides an address resolution request for another computing node that is also managed by that communication manager module, the routine may instead respond to the request without interaction with the system manager module, such as based on locally stored information. In addition, while in the illustrated embodiment the received request is a request to provide a computing node's link-layer hardware address that corresponds to an indicated networking layer address, in other embodiments the address resolution request may have other forms, or computing nodes may request other types of information about computing nodes that have indicated target network addresses.

In the illustrated embodiment, the routine next continues to block 525 to receive a response from the system manager module that includes a physical substrate network address and/or other information corresponding to the identified virtual network address (e.g., an indication that the target address is an external address, information about alternative network paths from the communication manager module to that target address, etc.), and stores information locally that maps that physical substrate network address and/or other information to a unique hardware address for later use by the routine (e.g., based on a dummy virtual hardware address generated by the routine or provided in the response), along with other information about the target destination as discussed in greater detail elsewhere. The routine then provides the hardware address to the requesting computing node, which it may use as part of one or more later communications that it sends to the target destination with the indicated target network address. The routine then continues to block 530 to determine if blocks 515-525 were performed as part of the handling of an outgoing node communication, as discussed with respect to blocks 540-560, and if so, continues to block 547. While not illustrated here, in some embodiments the routine may instead receive an error response from the system manager module (e.g., based on the requesting computing node not being authorized to communicate with the indicated destination computing node) or no response, and if so may not send any response to the requesting computing node or may send a corresponding error message to that computing node.

If it is instead determined in block 510 that the type of communication or other message is an outgoing node communication from a computing node managed by the routine to another indicated remote target destination that is not a computing node also managed by the routine, the routine continues to block 540 to identify the indicated hardware address for the indicated target final destination from the communication header. In block 545, the routine then determines whether that destination hardware address is a hardware address previously mapped to a physical substrate network address corresponding to the final destination, such as previously discussed with respect to block 525. If not, in some embodiments the routine continues to block 515 to perform blocks 515-525 to determine such a corresponding physical network address for the outgoing node communication, while in other embodiments such actions are not performed (e.g., if the indicated hardware address is not a mapped address, the routine may cause the outgoing node communication to fail, such as with an error message back to the sending node).

If the indicated hardware address is a mapped address, or the check is not performed, the routine continues to block 547 to determine whether the outgoing communication is to be sent as a multi-part message, such as based on a stored mapping of the indicated destination hardware address (e.g., if the stored mapping indicates that two or more associated alternative network paths are available, that network operation characteristics for one or more associated network paths exceed one or more specified thresholds or otherwise satisfy one or more specified criteria, etc.), or instead on other information (e.g., if the outgoing communication is related to one or more prior communications that have been sent or have not been sent as encoded multi-part messages, such as if the prior and current communications are part of a stream). In some embodiments, the determination may further include interacting with the system manager module to obtain some or all such information, or to obtain a determination by the system manager module regarding whether to send the outgoing communication as a multi-part message, although some interacting is not illustrated in this example. If the outgoing communication is not determined to be sent as an encoded multi-part message in block 547, the routine continues to block 550 to retrieve the physical substrate network address for the local computing node that is mapped to the hardware address. In block 555, the routine then rewrites the communication header in accordance with a networking address protocol for one or more intermediate substrate networks between the sending and destination computing nodes using the physical substrate network address retrieved in block 550. The header re-writing may further include changing other information in the new header, including changing a virtual network address for the sending computing node to be a corresponding physical substrate network address, and in at least some embodiments includes modifying the received communication without encapsulation as part of an overlay of the virtual computer network over the one or more intermediate substrate physical networks. Furthermore, for a communication whose destination hardware address does correspond to a logical networking device, the routine in block 555 may further perform other modifications that correspond to providing logical networking functionality to emulate the actions and functionality that would be performed by the one or more logical networking devices that would be used to forward the communication to the destination computing node in accordance with the configured network topology for the virtual computer network. In block 560, the routine then facilitates providing of the modified outgoing communication to the destination computing node, such as by initiating forwarding of the modified outgoing communication over the substrate intermediate network(s) to the destination computing node. While not illustrated here, in other embodiments various additional types of processing may be performed for outgoing node communications, such as to verify that the communications are valid or otherwise authorized in various ways (e.g., to verify that the sending computing node is authorized to send communications to the destination computing node, such as based on being associated with the same entity or part of the same virtual computer network, based on the sending and destination computing nodes being associated with different entities that are authorized to inter-communicate, based on the type of communication or other information specific to the communication, etc.).

If it is instead determined in block 547 that the outgoing communication is to be sent as an encoded multi-part message, the routine continues to block 581 to retrieve information about alternative network paths that are available for use in forwarding the encoded multi-part message for the communication to its final destination, such as based on information previously provided by the system manager module. In addition, in block 583, the routine optionally dynamically interacts with the system manager module to obtain current information corresponding to one or more of the alternative network paths, such as information about current network operation characteristics and/or any changes in network structural information. In block 585, the routine then uses the retrieved information to dynamically determine how to encode the multi-part message for the outgoing communication, such as to determine a quantity of parts to be used for the multi-part message, or more generally to determine code rate and/or reception efficiency numbers for the encoding. The routine then proceeds to encode the outgoing communication into the multiple parts for the multi-part message. It will be appreciated that such encoding may include various actions, including in some embodiments to add information to each of one or more of the encoded multiple parts (e.g., as part of the header information for the encoded part) to indicate that the encoded part is a portion of a multi-part message and/or to indicate the encoding scheme used for the multi-part message. In block 587, the routine then proceeds to, for each of the message parts, select one of the alternative network paths to use for the message part, and to select a substrate network address and/or other sending mechanism (e.g., outgoing network interface) to use for sending that message part to the final destination for the outgoing communication. After block 587, the routine continues to block 589 to, for each of the message parts, further encode the message part communication with respect to the one or more intermediate substrate networks through which the message part will be forwarded (e.g., by rewriting the header for the message part in accordance with a networking address protocol for the substrate network(s) and to use the physical substrate network address selected in block 587), and then forwards the encoded message part communication over the substrate network to the final destination along the selected alternative network path, such as in a manner similar to that previously described with respect to blocks 555 and 560. While this example routine describes that all of the multi-part message encoding is performed before any of the message parts are sent, it will be appreciated that the routine may operate in other manners in other embodiments, such as to send some or all message parts as soon as they are generated, as well as to more generally send different message parts along different alternative network paths in other embodiments without having the communication manager module perform a selection of a particular alternative network path.

In addition, while not illustrated in this example, in some embodiments incoming communications that are from external computer systems at other locations may further be received by an edge device or other edge module in order to encode those communications for forwarding over the substrate networks to their destination computing nodes, and such an edge module may further operate as a source communication manager module to encode the incoming communication into a multi-part message to be forwarded over the substrate network to its final destination, in a manner similar to that described with respect to blocks 581-589.

If it is instead determined in block 510 that the received message is an incoming node communication to a destination communication manager module for one of its managed computing nodes, from an external computing node managed by a different communication manager module, the routine continues to block 565 to identify the physical substrate network addresses for the sending and destination computing nodes from the communication header. After block 565, the routine continues to block 567 to optionally verify that the incoming communication is valid in one or more ways. For example, the routine may determine whether the physical substrate network address for the sending computing node is actually mapped to a computing node that corresponds to the source physical substrate network address location, such as based on interactions with a system manager module and/or based on other information previously obtained and stored by the routine. In addition, the routine may determine whether the physical substrate network address for the destination computing node corresponds to an actual managed computing node. While not illustrated here, if an incoming communication is determined to not be valid, the routine may take various actions not shown, such as to generate one or more errors and perform associated processing and/or drop the incoming communication without forwarding it to the indicated destination node. For example, if the incoming communication indicates a destination network address that does not correspond to a current managed computing node, the routine may drop the incoming communication and/or initiate an error message, although in some embodiments such error messages are not sent to the sending computing node.

In the illustrated embodiment, after block 567, the routine continues to block 569 to determine if the incoming communication is one of the multiple parts of an encoded multi-part message, such as based on corresponding information stored in the header for such message parts, or instead based on other information specified to such message parts. If so, the routine continues to block 571 to determine whether the routine has received sufficient parts of the multi-part message to decode the multi-part message. Such a determination may be performed in various manners. For example, in some embodiments all message parts may be used for a decoding, and if so the routine determines if all message parts have been received. In other embodiments, the encoding for a particular multi-part message may use an encoding scheme in which only a subset of the encoded message parts are needed, and if so the routine determines if at least that subset has been received. The determination of a particular encoding scheme (e.g., a particular subset of message parts that is needed) may be performed in various manners, such as based on a pre-configuration of the sending and destination communication manager modules, based on information included in the header of or otherwise with the received message part, etc. In yet other embodiments, the routine may attempt to decode the multi-part message every time that a message part is received, and determine that sufficient message parts have been received if the decoding succeeds. If it is determined in block 571 that sufficient message parts have not been received, the routine continues to block 573 to store the received message part for later decoding (e.g., along with any other associated received message parts for the same encoded multi-part message, such as based on header information included in the various encoded message parts). Otherwise, the routine continues to block 575 to retrieve one or more previously stored message parts for the encoded multi-part message, and decodes the original sent communication for some or all of the retrieved and currently received message parts.

After the multi-part message is decoded into the original communication in block 575, or if it is determined in block 569 that the incoming communication is not part of a multi-part message, the routine continues to block 577 to retrieve the hardware address and the virtual network address that are mapped to the physical destination substrate network address, and to rewrite the communication header of the decoded or received original communication for the virtual computer network so that it appears to be sent to a computing node with that virtual network address and hardware address. For example, in some embodiments the destination virtual network address may be obtained from the destination physical substrate network address itself, such as from a subset of the bits of the destination physical substrate network address. In addition, the destination hardware address may have previously been mapped to the physical destination substrate network address, such as previously discussed with respect to block 525. In situations in which such prior mapping has not occurred, the routine may instead perform blocks 515-525 to obtain such information. The routine may similarly rewrite the communication header for the virtual computer network so that it appears to be sent from a computing node with a source virtual network address and source hardware address corresponding to the sending computing node. Furthermore, in at least some embodiments, the routine in block 577 may further perform other modifications to the incoming communication that correspond to providing logical networking functionality to emulate the actions and functionality that would be performed by one or more logical networking devices that would have been used to forward the communication to the destination computing node in accordance with the configured network topology for the virtual computer network. After block 577, the routine continues to block 580 to facilitate providing of the modified incoming communication to the destination computing node, such as by initiating forwarding of the modified incoming communication to the destination node.

If it is instead determined in block 510 that a message of another type is received, the routine continues to block 590 to perform another indicated operation as appropriate, such as to store information about entities associated with particular computing nodes, store configuration information about alternative network paths and/or portions of such alternative network paths, store current or recent tracking information about alternative network paths (e.g., current network operation characteristics), store information about configured network topologies for particular virtual computer networks, respond to requests and other messages from computing nodes in a manner to provide logical networking functionality corresponding to configured network topologies for virtual computer networks (e.g., by emulating actions and other functionalities that would be performed by specified logical networking devices if they were physically implemented), update previously mapped or stored information to reflect changes with respect to computing nodes that are being managed or to remote computing nodes, perform operations to forward communications between multiple managed computing nodes of the communication manager module without forwarding such communications over the substrate network, etc. The storing and/or updating of stored information may be initiated in various manners, such as by receiving information in response to previous requests, periodically requesting such information, receiving information that is proactively pushed to the routine without a corresponding request, etc.

After blocks 560, 573, 580, 589 or 590, or if it is instead determined in block 530 that the processing is not being performed with respect to an outgoing communication, the routine continues to block 595 to determine whether to continue, such as until an explicit indication to terminate is received. If it is determined to continue, the routine returns to block 505, and if not continues to block 599 and ends.

In addition, various embodiments may provide mechanisms for customer users and other entities to interact with an embodiment of the system manager module for the purpose of configuring computing nodes and their communications. For example, some embodiments may provide an interactive console (e.g. a client application program providing an interactive user interface, a Web browser-based interface, etc.) from which users can manage the creation or deletion of virtual computer networks, the configuration of specified VLANs for virtual computer networks, the configuration of network topology information for virtual computer networks, and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; the specification of preference information of various types; etc.). In some embodiments, some or all of the functionality of an embodiment of the CNS system may be provided in exchange for fees from users or other entities acting as customers or other clients of the CNS system, and if so the mechanisms for such clients to interact with an embodiment of the system manager module may include mechanisms for users and other entities to provide payment and payment-related information, as well as to monitor corresponding payment information. In addition, some embodiments may provide an API that allows other computing systems and programs to programmatically invoke at least some of the described functionality, such as APIs provided by libraries or class interfaces (e.g., to be invoked by programs written in C, C++, or Java) or otherwise, and/or using network service protocols such as via Web services. Additional details related to the operation of example embodiments of a program execution service with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" U.S. application Ser. No. 11/692,038, filed Mar. 27, 2007 and entitled "Configuring Intercommunications Between Computing Nodes;" and U.S. application Ser. No. 12/332,214, filed Dec. 10, 2008 and entitled "Providing Access To Configurable Private Computer Networks;" each of which is incorporated herein by reference in its entirety. In addition, additional details related to the management of provided virtual networks that may be used by at least some embodiments of a CNS system, such as in conjunction with an Overlay Network Manager module of such a CNS system, are available in U.S. application Ser. No. 12/060,074, filed Mar. 31, 2008 and entitled "Configuring Communications Between Computing Nodes;" and in U.S. application Ser. No. 12/414,260, filed Mar. 30, 2009 and entitled "Providing Virtual Networking Functionality For Managed Computer Networks;" each of which is also incorporated herein by reference in its entirety.

It will also be appreciated that, although in some embodiments the described techniques are employed in the context of a data center housing multiple physical machines hosting virtual machines, other implementation scenarios are also possible. For example, the described techniques may be employed in the context an organization-wide network or networks operated by a business or other institution (e.g. university) for the benefit of its employees and/or members. Alternatively, the described techniques may be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-piece application (e.g., a multi-tiered business application) may in some embodiments use the described techniques to provide functional decomposition and/or isolation for the various types of interacting pieces (e.g., Web front-ends, database servers, business rules engines, etc.). More generally, the described techniques may be used to virtualize physical networks to reflect almost any situation that would conventionally necessitate physical partitioning of distinct computing systems and/or networks.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A non-transitory computer-readable storage medium having stored contents that configure a computing system to perform a method, the method comprising:
    obtaining information regarding a first virtual computer network having multiple computing nodes, the first virtual computer network being overlaid on a distinct substrate network that interconnects the multiple computing nodes; and
    automatically managing one or more communications sent by one or more of the multiple computing nodes of the first virtual computer network, the multiple communications each being sent by a sending one of the multiple computing nodes and having an intended final destination, the managing of each of the one or more communications being performed by the configured computing system and including:
        automatically determining one or more alternative paths from the sending computing node for the communication to the intended final destination of the communication;
        automatically determining a first quantity of one or more parts into which to encode the communication based at least in part on information about the determined alternative paths, and encoding the communication into the determined first quantity of parts; and
        forwarding each of the parts of the communication from the sending computing node for the communication to the intended final destination of the communication along one of the determined alternative paths, wherein each of the determined alternative paths is used to forward at least one of the parts.

2. The non-transitory computer-readable storage medium of claim 1 wherein, for each of at least one of the one or more communications, the automatically determined alternative paths for the communication include multiple alternative paths, the information about the determined alternative paths on which the automatic determining of the first quantity of parts for the communication is based includes a second quantity of the multiple alternative paths, the determined first quantity for the communication is greater than one such that the encoded parts of the communication include multiple parts, and the encoding of the communication is performed to enable the communication to be decoded from a subset of the encoded multiple parts that has a third quantity less than the determined first quantity.

3. The non-transitory computer-readable storage medium of claim 1 wherein, for each of at least one of the one or more communications, the automatically determined one or more alternative paths for the communication have operational characteristics that correspond to communications sent along the determined alternative paths that are not successfully received at destinations of those communications, the information about the determined alternative paths on which the automatic determining of the first quantity of parts for the communication is based includes the operational characteristics of the determined alternative paths, the determined first quantity for the communication is greater than one such that the encoded parts of the communication include multiple parts, and the encoding of the communication is performed to enable the communication to be decoded from a subset of the encoded multiple parts that has a third quantity less than the determined first quantity.

4. The non-transitory computer-readable storage medium of claim 1 wherein the intended final destination for one of the one or more communications is at a second location remote from a first location of the sending computing node for the one communication, wherein the automatically determined alternative paths for the one communication include multiple alternative paths between the first and second locations, wherein the determined first quantity for the one communication is greater than one such that the encoded parts of the one communication include multiple parts, and wherein the forwarding of the multiple parts of the one communication along the multiple alternative paths includes using multiple edge modules at the first location that are each associated with at least one of the multiple alternative paths.

5. The non-transitory computer-readable storage medium of claim 1 wherein the intended final destination for one of the one or more communications is one of the multiple computing nodes, wherein the automatically determined alternative paths for the one communication include multiple alternative paths through at least a portion of the substrate network, wherein the determined first quantity for the one communication is greater than one such that the encoded parts of the one communication include multiple parts, wherein each of the multiple computing nodes has at least one associated first virtual network address for the first virtual computer network and has at least one distinct associated second substrate network address that corresponds to a location of the computing node in the substrate network, and wherein the forwarding of the multiple parts of the one communication along the multiple alternative paths includes using multiple substrate network addresses corresponding to the multiple alternative paths.

6. The non-transitory computer-readable storage medium of claim 5 wherein the forwarding of the multiple parts of the one communication along the multiple alternative paths using the multiple substrate network addresses corresponding to the multiple alternative paths includes, for each of the multiple parts, automatically selecting one of the multiple alternative paths to use for forwarding the part by performing hashing using information specific to the part being forwarded.

7. The non-transitory computer-readable storage medium of claim 1 wherein, for each of at least one of the one or more communications, the automatically determined alternative paths for the communication include a single alternative path, the determined first quantity for the communication is one such that the encoded parts of the communication include a single part, and the encoding of the communication includes adding additional information to the encoded single part related to error correction to enable the communication to be decoded from a subset of the encoded single part.

8. The non-transitory computer-readable storage medium of claim 1 wherein the obtained information is configuration information specified by a user on whose behalf the first virtual computer network is provided, wherein the determined first quantity for one of the one or more communications is greater than one such that the encoded parts of the one communication include multiple parts, wherein the encoding of the one communication into the determined first quantity of parts is performed using an erasure code, and wherein the method further comprises:
receiving at least some of the multiple parts of the one communication after the received at least some parts are forwarded along the determined alternative paths to the intended final destination for the one communication;
decoding the received at least some parts into the one communication based on the erasure code; and
after the decoding, providing the one communication to the intended final destination for the one communication.

9. The non-transitory computer-readable storage medium of claim 1 wherein the computer-readable medium is a memory of the configured computing system that stores the contents, and wherein the contents are instructions that when executed program the computing system to perform the method.

10. A computer-implemented method comprising:
obtaining information regarding a first virtual computer network having multiple computing nodes, the first virtual computer network being overlaid on a distinct substrate network that interconnects the multiple computing nodes; and
managing, by one or more configured computing systems, a communication sent by a sending one of the multiple computing nodes of the first virtual computer network to an intended final destination, the managing of the communication including:
determining, by the one or more configured computing systems, one or more alternative paths from the sending one computing node to the intended final destination;
determining, by the one or more configured computing systems, a first quantity of one or more parts into which to encode the communication based at least in part on information about the determined alternative paths, and encoding the communication into the one or more parts of the determined first quantity; and
forwarding, by the one or more configured computing systems, each of the parts of the encoded communication from the sending one computing node to the intended final destination along one of the determined alternative paths, wherein each of the determined alternative paths is used to forward at least one of the parts.

11. The method of claim 10 wherein the determined one or more alternative paths include multiple alternative paths.

12. The method of claim 11 wherein the information about the determined alternative paths on which the determining of the first quantity of parts is based includes a quantity of the multiple alternative paths.

13. The method of claim 10 wherein the determined first quantity is greater than one, and wherein the encoding of the communication includes generating multiple parts of the encoded communication.

14. The method of claim 13 wherein the encoding of the communication is further performed to enable the communication to be decoded from a subset of less than all of the multiple parts.

15. The method of claim 10 wherein the determined one or more alternative paths have operational characteristics corresponding to communications that are not successfully received at destinations of those communications, and wherein the information about the determined alternative paths on which the determining of the first quantity of parts is based includes the operational characteristics of the determined alternative paths.

16. The method of claim 10 wherein the intended final destination is at a second location remote from a first location of the sending one computing node, wherein the determined alternative paths for the communication include multiple alternative paths between the first and second locations, and wherein the forwarding of the parts of the encoded communication includes using multiple edge modules at the first location that are each associated with at least one of the multiple alternative paths.

17. The method of claim 10 wherein the intended final destination is one of the multiple computing nodes, and wherein the determined alternative paths for the communication include multiple alternative paths through at least a portion of the substrate network.

18. The method of claim 17 wherein each of the multiple computing nodes has at least one associated first virtual network address for the first virtual computer network and has at least one distinct associated second substrate network address that corresponds to a location of the computing node in the substrate network, and wherein the forwarding of the parts of the encoded communication includes using multiple substrate network addresses corresponding to the multiple alternative paths.

19. The method of claim 18 wherein the encoding of the communication includes generating multiple parts of the encoded communication, and wherein the forwarding of the parts of the encoded communication using the multiple substrate network addresses includes, for each of the multiple parts, selecting one of the multiple alternative paths to use for forwarding the part by performing hashing using information specific to the part being forwarded.

20. The method of claim 10 wherein the determined alternative paths for the communication include a single alternative path.

21. The method of claim 20 wherein the determined first quantity is one such that the one or more parts of the encoded communication include a single part, and wherein the encoding of the communication includes adding additional information to the single part related to error correction to enable the communication to be decoded from a subset of less than all of the single part.

22. The method of claim 10 wherein the one or more configured computing systems are part of a configurable network service that provides the first virtual computer network to a first client and that provides multiple other virtual computer networks to multiple other clients, wherein the obtained information is configuration information specified by the first client, and wherein the method further comprises providing the first virtual computer network in accordance with the configuration information by overlaying the first virtual computer network on the substrate network.

23. The method of claim 10 wherein the determined first quantity is greater than one such that the one or more parts of the encoded communication include multiple parts, and wherein the encoding of the communication into the determined first quantity of parts is performed using an erasure code.

24. The method of claim 23 further comprising:
receiving at least some of the multiple parts after the received at least some parts are forwarded along the determined alternative paths to the intended final destination;
decoding the received at least some parts into the communication based on the erasure code; and
after the decoding, providing the communication to the intended final destination.

25. The method of claim 10 further comprising:
receiving an indication of a second communication to be sent over the substrate network from the sending one computing node to a second intended final destination;
determining, by the one or more configured computing systems, to not encode the second communication into multiple parts; and
forwarding the second communication from the sending one computing node to the second intended final destination along a single path.

26. The method of claim 10 wherein the communication is a first communication and the intended final destination for the first communication is a first intended final destination, and wherein the method further comprises:
receiving an indication of a second communication to be sent over the substrate network from the sending one computing node to a second intended final destination;
determining, by the one or more configured computing systems, a second quantity of multiple parts into which to encode the second communication, the determined second quantity being distinct from the determined first quantity;
encoding the second communication into the multiple parts of the determined second quantity; and
forwarding each of the multiple parts of the second communication from the sending one computing node to the second intended final destination.

27. The method of claim 26 wherein the second intended final destination is the first intended final destination and the second communication is sent at a different time than the first communication, and wherein the determined second quantity differs from the determined first quantity based on a change in path availability from the second one computing node to the first intended final destination between the different times of sending the first and second communications or on a change in operational characteristics of the determined one or more alternative paths between the different times of sending the first and second communications.

28. The method of claim 10 wherein the determined one or more alternative paths include multiple alternative paths, the multiple alternative paths including multiple alternative network links between two or more locations in the substrate network, multiple physical network interfaces available for sending the communication from the sending one computing node to the substrate network, multiple logical network interfaces available for sending the communication from the sending one computing node to the substrate network, multiple physical network interfaces available for receiving the communication from the substrate network for the intended final destination, of multiple logical network interfaces available for receiving the communication from the substrate network for the intended final destination.

29. The method of claim 10 wherein the communication is one of multiple packets for use in transferring one or more memory pages from the sending one computing node to the intended final destination as part of a migration of one or more executing programs from the sending one computing node to the intended final destination, and wherein the method further comprises, for each of the multiple packets other than the communication, encoding the packet into multiple other parts and forwarding the multiple other parts as distinct packets over the determined alternative paths from the sending one computing node to the intended final destination.

30. A system comprising:
one or more processors of one or more computing systems; and
one or more modules that are configured to, when executed by at least one of the one or more processors:
obtain information regarding a first virtual computer network having multiple computing nodes, the first virtual computer network being overlaid on a distinct substrate network that interconnects the multiple computing nodes; and
managing one or more communications sent by one or more of the multiple computing nodes of the first virtual computer network, the multiple communications each being sent by a sending one of the multiple computing nodes and having an intended final destination, the managing of each of the one or more communications including:
determining one or more alternative paths from the sending computing node for the communication to the intended final destination of the communication;
determining a first quantity of one or more parts into which to encode the communication based at least in part on information about the determined alternative paths, and encoding the communication into the one or more parts of the determined first quantity; and
forwarding each of the parts of the encoded communication from the sending computing node for the communication to the intended final destination of the communication along one of the determined alternative paths, wherein each of the determined alternative paths is used to forward at least one of the parts.

31. The system of claim 30 wherein, for each of at least one of the one or more communications, the determined alternative paths for the communication include multiple alternative paths, and the determined first quantity for the communication is greater than one, and wherein the one or more modules include software instructions for execution by the at least one processors.

* * * * *

UNITED STATES PATENT AND TRADEMARK OFFICE
CERTIFICATE OF CORRECTION

PATENT NO. : 8,612,627 B1
APPLICATION NO. : 12/717058
DATED : December 17, 2013
INVENTOR(S) : Eric Jason Brandwine It is certified that error appears in the above-identified patent and that said Letters Patent is hereby corrected as shown below:

Title Page 2, Column 2, Item (56), Line 57:
"Clark, C., et al, "Live Migration of Virtual Machines," retrieved on March 16, 2009, from http://www.cl.cam.ac.uk/research/srg/netos/pa-pers/2005-migration-nsdi-pre.pdf, 14 pages."
should read, --Clark, C., et al, "Live Migration of Virtual Machines," retrieved on March 16, 2009, from http://www.cl.cam.ac.uk/research/srg/netos/papers/2005-migration-nsdi-pre.pdf, 14 pages.--

Signed and Sealed this
Fifteenth Day of July, 2014

Michelle K. Lee
*Deputy Director of the United States Patent and Trademark Office*